United States Patent
Tzannes

(10) Patent No.: US 10,187,240 B2
(45) Date of Patent: Jan. 22, 2019

(54) SYSTEM AND METHOD FOR SCRAMBLING THE PHASE OF THE CARRIERS IN A MULTICARRIER COMMUNICATIONS SYSTEM

(71) Applicant: TQ DELTA, LLC, Austin, TX (US)

(72) Inventor: Marcos C. Tzannes, Petaluma, CA (US)

(73) Assignee: TQ DELTA, LLC, Austin, TX (US)

(*) Notice: Subject to any disclaimer, the term of this patent is extended or adjusted under 35 U.S.C. 154(b) by 0 days.

(21) Appl. No.: 15/693,914

(22) Filed: Sep. 1, 2017

(65) Prior Publication Data

US 2018/0013599 A1  Jan. 11, 2018

Related U.S. Application Data

(63) Continuation of application No. 14/540,332, filed on Nov. 13, 2014, now Pat. No. 9,755,876, which is a (Continued)

(51) Int. Cl.
*H04K 1/10* (2006.01)
*H04L 27/28* (2006.01)
(Continued)

(52) U.S. Cl.
CPC ........... *H04L 27/2621* (2013.01); *H04B 1/38* (2013.01); *H04B 1/40* (2013.01);
(Continued)

(58) Field of Classification Search
CPC ............ H04L 27/2621; H04L 27/2627; H04L 27/2614; H04L 25/03866; H04L 27/20;
(Continued)

(56) References Cited

U.S. PATENT DOCUMENTS 3,811,038 A   5/1974   Reddaway
3,898,566 A   8/1975   Switzer et al.
(Continued)

FOREIGN PATENT DOCUMENTS

EP   0552034 A2   7/1993
EP   0584534      3/1994
(Continued)

OTHER PUBLICATIONS

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed on Sep. 7, 2017 and made Publicly Available on Dec. 6, 2017; Docket No. 357; (156 pages).
(Continued)

*Primary Examiner* — Phuong Phu
(74) *Attorney, Agent, or Firm* — Jason H. Vick; Sheridan Ross, PC

(57) ABSTRACT

A system and method that scrambles the phase characteristic of a carrier signal are described. The scrambling of the phase characteristic of each carrier signal includes associating a value with each carrier signal and computing a phase shift for each carrier signal based on the value associated with that carrier signal. The value is determined independently of any input bit value carried by that carrier signal. The phase shift computed for each carrier signal is combined with the phase characteristic of that carrier signal so as to substantially scramble the phase characteristic of the carrier signals. Bits of an input signal are modulated onto the carrier signals having the substantially scrambled phase characteristic to produce a transmission signal with a reduced PAR.

23 Claims, 2 Drawing Sheets

Related U.S. Application Data continuation of application No. 14/256,677, filed on Apr. 18, 2014, now Pat. No. 8,929,470, which is a continuation of application No. 13/303,417, filed on Nov. 23, 2011, now Pat. No. 8,718,158, which is a continuation of application No. 12/783,725, filed on May 20, 2010, now Pat. No. 8,090,008, which is a continuation of application No. 12/255,713, filed on Oct. 22, 2008, now Pat. No. 7,769,104, which is a continuation of application No. 11/863,581, filed on Sep. 28, 2007, now Pat. No. 7,471,721, which is a continuation of application No. 11/211,535, filed on Aug. 26, 2005, now Pat. No. 7,292,627, which is a continuation of application No. 09/710,310, filed on Nov. 9, 2000, now Pat. No. 6,961,369.

(60) Provisional application No. 60/164,134, filed on Nov. 9, 1999.

(51) Int. Cl.
   H04L 27/26 (2006.01)
   H04L 25/03 (2006.01)
   H04B 1/40 (2015.01)
   H04B 1/38 (2015.01)
   H04L 27/20 (2006.01)

(52) U.S. Cl.
   CPC ........ *H04L 25/03866* (2013.01); *H04L 27/20* (2013.01); *H04L 27/2601* (2013.01); *H04L 27/2614* (2013.01); *H04L 27/2627* (2013.01)

(58) Field of Classification Search
   CPC ... H04L 27/2601; H04L 27/2607; H04B 1/38; H04B 1/40
   USPC .................................................. 375/260, 296
   See application file for complete search history.

(56) References Cited

U.S. PATENT DOCUMENTS

| | | |
|---|---|---|
| 3,955,141 A | 5/1976 | Lyon et al. |
| 4,069,392 A | 1/1978 | Goldenberg et al. |
| 4,358,853 A | 11/1982 | Qureshi |
| 4,408,298 A | 10/1983 | Ruhland |
| 4,672,629 A | 6/1987 | Beier |
| 4,891,806 A | 1/1990 | Farias et al. |
| 4,924,516 A | 5/1990 | Bremer et al. |
| 4,979,174 A | 12/1990 | Cheng et al. |
| 4,985,900 A | 1/1991 | Rhind et al. |
| 5,025,234 A | 6/1991 | De Luca |
| 5,101,417 A | 3/1992 | Richley et al. |
| 5,214,501 A | 5/1993 | Cavallerano et al. |
| 5,287,384 A | 2/1994 | Avery et al. |
| 5,307,410 A | 4/1994 | Bennett |
| 5,351,016 A | 9/1994 | Dent |
| 5,351,123 A | 9/1994 | Spanhlinger |
| 5,367,516 A | 11/1994 | Miller |
| 5,381,449 A | 1/1995 | Jasper et al. |
| 5,420,640 A | 5/1995 | Munich et al. |
| 5,422,913 A | 6/1995 | Wilkinson |
| 5,526,389 A | 6/1996 | Buell et al. |
| 5,550,578 A | 8/1996 | Hoarty et al. |
| 5,596,604 A | 1/1997 | Cioffi et al. |
| 5,600,678 A | 2/1997 | Petranovich et al. |
| 5,635,864 A | 6/1997 | Jones |
| 5,675,585 A | 10/1997 | Bonnot et al. |
| 5,682,376 A * | 10/1997 | Hayashino ......... H04L 27/2607 370/206 |
| 5,694,389 A | 12/1997 | Seki et al. |
| 5,694,395 A | 12/1997 | Myer et al. |
| 5,694,415 A | 12/1997 | Suzuki et al. |
| 5,696,415 A | 12/1997 | Fujimoto et al. |
| 5,742,679 A | 4/1998 | Olafsson |
| 5,745,275 A | 4/1998 | Giles et al. |
| 5,748,677 A | 5/1998 | Kumar |
| 5,751,338 A | 5/1998 | Ludwig, Jr. |
| 5,764,649 A | 6/1998 | Tong |
| 5,764,693 A | 6/1998 | Taylor et al. |
| 5,793,759 A | 8/1998 | Rakib et al. |
| 5,835,527 A | 11/1998 | Lomp |
| 5,838,732 A | 11/1998 | Carney |
| 5,870,016 A | 2/1999 | Shrestha |
| 5,896,419 A | 4/1999 | Suzuki |
| 5,903,612 A | 5/1999 | Van Der Puttent et al. |
| 5,903,614 A | 5/1999 | Suzuki et al. |
| 5,905,874 A | 5/1999 | Johnson |
| 5,907,047 A | 5/1999 | Hansske et al. |
| 5,914,932 A | 6/1999 | Suzuki et al. |
| 5,917,340 A | 6/1999 | Manohar et al. |
| 5,937,010 A | 8/1999 | Petranovich et al. |
| 5,940,406 A | 8/1999 | Bolle |
| 5,991,262 A | 11/1999 | Laird et al. |
| 5,995,539 A | 11/1999 | Miller |
| 6,026,123 A | 2/2000 | Williams |
| 6,041,057 A | 3/2000 | Stone |
| 6,081,291 A | 6/2000 | Ludwig, Jr. |
| 6,081,502 A | 6/2000 | Paneth et al. |
| 6,088,406 A | 7/2000 | Suzuki |
| 6,112,094 A | 8/2000 | Dent |
| 6,125,103 A | 9/2000 | Bauml et al. |
| 6,128,350 A | 10/2000 | Shastri et al. |
| 6,144,696 A | 11/2000 | Shively et al. |
| 6,226,322 B1 | 5/2001 | Mukherjee |
| 6,233,247 B1 | 5/2001 | Alami et al. |
| 6,240,141 B1 | 5/2001 | Long |
| 6,243,414 B1 | 6/2001 | Drucker et al. |
| 6,256,355 B1 | 7/2001 | Sakoda et al. |
| 6,259,685 B1 | 7/2001 | Rinne et al. |
| 6,301,268 B1 | 10/2001 | Laroia et al. |
| 6,308,278 B1 | 10/2001 | Khouli et al. |
| 6,310,869 B1 | 10/2001 | Holtzman et al. |
| 6,314,146 B1 | 11/2001 | Tellado et al. |
| 6,324,171 B1 | 11/2001 | Lee et al. |
| 6,366,555 B1 | 4/2002 | Gatherer et al. |
| 6,389,080 B1 | 5/2002 | Barnes |
| 6,389,138 B1 | 5/2002 | Li et al. |
| 6,421,323 B1 | 7/2002 | Nelson et al. |
| 6,424,646 B1 | 7/2002 | Gerszberg et al. |
| 6,438,186 B1 | 8/2002 | Strait |
| 6,456,669 B1 | 9/2002 | Sakoda |
| 6,473,418 B1 | 10/2002 | Laroia et al. |
| 6,507,585 B1 | 1/2003 | Dobson |
| 6,519,292 B1 | 2/2003 | Sakoda et al. |
| 6,556,557 B1 | 4/2003 | Cimini, Jr. et al. |
| 6,563,881 B1 | 5/2003 | Sakoda et al. |
| 6,574,283 B1 | 6/2003 | Sakoda et al. |
| 6,578,162 B1 | 6/2003 | Yung |
| 6,590,860 B1 | 7/2003 | Sakoda et al. |
| 6,590,893 B1 | 7/2003 | Hwang et al. |
| 6,625,219 B1 | 9/2003 | Stopler |
| 6,640,239 B1 | 10/2003 | Gidwani |
| 6,643,281 B1 | 11/2003 | Ryan |
| 6,657,949 B1 | 12/2003 | Jones, IV et al. |
| 6,704,317 B1 | 3/2004 | Dobson |
| 6,721,349 B1 | 4/2004 | Willenegger et al. |
| 6,731,594 B1 | 5/2004 | Bohnke |
| 6,754,290 B1 | 6/2004 | Halter |
| 6,757,299 B1 | 6/2004 | Verma |
| 6,781,951 B1 | 8/2004 | Fifield |
| 6,785,258 B1 | 8/2004 | Garcia, Jr. et al. |
| 6,798,736 B1 | 9/2004 | Black et al. |
| 6,807,145 B1 | 10/2004 | Weerackody et al. |
| 6,874,109 B1 | 3/2005 | Rajski et al. |
| 6,904,537 B1 | 6/2005 | Gorman |
| 6,961,369 B1 | 11/2005 | Tzannes |
| 6,963,599 B1 | 11/2005 | Dunn |
| 6,967,997 B2 | 11/2005 | Humphrey |
| 7,024,592 B1 | 4/2006 | Voas et al. |
| 7,072,410 B1 | 7/2006 | Monsen |
| 7,107,023 B1 | 9/2006 | Derome, Jr. et al. |
| 7,200,138 B2 | 4/2007 | Liu |

(56) References Cited

U.S. PATENT DOCUMENTS

| | | | |
|---|---|---|---|
| 7,203,206 | B2 | 4/2007 | Amidan et al. |
| 7,257,168 | B2 | 8/2007 | Goldstein et al. |
| 7,286,614 | B2 | 10/2007 | Goldstein et al. |
| 7,292,627 | B2 | 11/2007 | Tzannes |
| 7,400,688 | B2 | 7/2008 | Garrett |
| 7,471,721 | B2 | 12/2008 | Tzannes |
| 7,610,028 | B2 | 10/2009 | Cimini, Jr. et al. |
| 7,616,704 | B2 | 11/2009 | Li et al. |
| 7,769,104 | B2 | 8/2010 | Tzannes |
| 8,073,041 | B1 | 12/2011 | Tzannes |
| 8,090,008 | B2 | 1/2012 | Tzannes |
| 8,218,610 | B2 | 7/2012 | Tzannes |
| 8,355,427 | B2 | 1/2013 | Tzannes |
| 8,718,158 | B2 | 5/2014 | Tzannes |
| 8,929,470 | B2 | 1/2015 | Tzannes |
| 9,014,243 | B2 | 4/2015 | Tzannes |
| 9,485,128 | B2 | 11/2016 | Tzannes |
| 9,755,876 | B2 * | 9/2017 | Tzannes .............. H04L 27/2621 |
| 2001/0031014 | A1 | 10/2001 | Subramanian et al. |
| 2001/0055282 | A1 | 12/2001 | Knisely et al. |
| 2002/0015401 | A1 | 2/2002 | Subramanian et al. |
| 2002/0172146 | A1 | 11/2002 | Wu et al. |
| 2003/0128673 | A1 | 7/2003 | Lee et al. |
| 2003/0131209 | A1 | 7/2003 | Lee |
| 2004/0120435 | A1 | 6/2004 | Yang et al. |
| 2005/0079889 | A1 | 4/2005 | Vaglica et al. |
| 2005/0141410 | A1 | 6/2005 | Zhang et al. |
| 2006/0092902 | A1 | 5/2006 | Schmidt |
| 2006/0140288 | A1 | 6/2006 | Holden |
| 2010/0190507 | A1 | 7/2010 | Karabinis et al. |
| 2017/0041173 | A1 | 2/2017 | Tzannes |

FOREIGN PATENT DOCUMENTS

| | | |
|---|---|---|
| EP | 0719004 | 6/1996 |
| EP | 0743768 A1 | 11/1996 |
| EP | 0866578 A2 | 9/1998 |
| EP | 0892517 A2 | 1/1999 |
| EP | 0895389 A2 | 2/1999 |
| EP | 0898400 A2 | 2/1999 |
| EP | 0961515 A1 | 12/1999 |
| EP | 0966133 A2 | 12/1999 |
| EP | 1047235 A1 | 1/2000 |
| EP | 1014609 A1 | 6/2000 |
| EP | 1109356 A2 | 6/2001 |
| EP | 1542488 | 6/2005 |
| EP | 1269670 B1 | 1/2011 |
| GB | 2330491 | 4/1999 |
| JP | H08(1996)-321820 | 12/1996 |
| JP | H10(1998)-084329 | 3/1998 |
| WO | WO 98/10549 | 3/1998 |
| WO | WO 98/32065 | 7/1998 |
| WO | WO 98/47238 | 10/1998 |
| WO | WO 99/22463 | 5/1999 |
| WO | WO 99/29078 | 6/1999 |
| WO | WO 99/55025 | 10/1999 |
| WO | WO 00/41395 | 7/2000 |
| WO | WO 00/79747 | 12/2000 |
| WO | WO 01/11833 | 2/2001 |

OTHER PUBLICATIONS

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Oct. 27, 2017-Dec. 21, 2017; Docket Nos. 390-451; (1,411 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Sep. 7, 2017, made Publicly Available on Dec. 6, 2017; Docket No. 323; (156 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Oct. 30, 2017-Dec. 5, 2017; Docket Nos. 353-375; (862 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Sep. 7, 2017, made Publicly Available on Dec. 6, 2017; Docket No. 342; (156 pages).
Documents filed with District Court Proceedings for *TQ Delta, LLC v. Zyxel communications Inc. et al.*; U.S. District Court, for the District of Delaware (Wilmington); Civil Action No. 1:13-cv-02013-RGA; Includes documents filed from Oct. 27, 2017-Dec. 21, 2017; Docket Nos. 373-434; (1,843 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Sep. 7, 2017, made Publicly Available on Dec. 6, 2017; Docket No. 197; (157 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Oct. 27, 2017-Dec. 21, 2017; Docket Nos. 234-290; (1664 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Sep. 7, 2017, made Publicly Available on Dec. 6, 2017; Docket No. 199; (157 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Oct. 27, 2017-Dec. 21, 2017; Docket Nos. 236-291 (1662 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed on Oct. 30, 2017; Docket No. 236 (212 pages).
Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed on Oct. 30, 2017; Docket No. 234 (212 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed on Oct. 30, 2017; Docket No. 225; (212 pages).
Documents filed with District Court Proceedings for *TQ Delta, LLC v. Dish Network Corporation et al.*; U.S. District Court, for the District of Delaware (Wilmington); Civil Action No. 1:15-cv-00614-RGA; Includes documents filed on Oct. 30, 2017; Docket No. 220; (212 pages).
Documents filed with District Court Proceedings for *TQ Delta, LLC v. Time Warner Cable Inc., et al.*; U.S. District Court for the District of Delaware (Wilmington); Civil Action No. 1:15-cv-00615-RGA; Includes documents filed on Oct. 30, 2017; Docket No. 223; (212 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed on Oct. 30, 2017; Docket No. 236; (212 pages).
U.S. Appl. No. 60/078,549, filed Mar. 19, 1998, Jacobsen et al.
U.S. Appl. No. 60/164,134, filed Nov. 9, 1999, Tzannes.
Anderson, John et al. "Digital Phase Modulation" 1986; Chapter 2 pp. 15-54 (42 pages).
Bauer, Rainer et al. "Iterative Source/Channel-Decoding Using Reversible Variable Length Codes" Munich University of Technology, 2000 (10 pages).

(56) References Cited

OTHER PUBLICATIONS

Bäuml et al., "Reducing the Peak-To-Average Power Ratio of Multicarrier Modulation by Selected Mapping," Electronics Letters, GB, IEE Stevenage, vol. 32(22), Oct. 24, 1996, pp. 2056-2057, XP000643915 ISSN: 0013-5194.
Boyd, Stephen "Multitone Signals with Low Crest Factor" IEEE Transactions on Circuits and Systems, vol. CAS-33, Nov. 10, Oct. 1986 (5 pages).
Business Wire "New FatPipe T1 Speed Product Produces Speeds up to 4.5Mbps and Redundancy fora Fraction of the Cost of a Fractional T3!" Business Wire, Oct. 16, 1998 (2 pages).
Cisco Systems, Inc. "Alternatives for High Bandwidth Connections Using Parallel T1/E1 Links" 1998 (8 pages).
Crawford, Paul "User Station Design Justification—PLL Design and Simulation" Meteosat Second Generation; EUM/MSG/128-B; Issue 5.0; Aug. 23, 1999 (49 pages).
Djokovic, Igor "PAR Reduction without Noise Enhancement" T1E1.4 Contribution No. T1E1.4/97-207, Sep. 22, 1997 (3 pages).
Golay, Marcel, J.E. "Complementary Series," IRE Trans. on Information Theory, Apr. 1961 (6 pages).
Goodman, David et al. "Maximizing the Throughput to CDMA Data Communications" Polytechnic University, Brooklyn, NY, Oct. 2003 (5 pages).
Henkel, "Analog Codes for Peak-to-Average Ratio Reduction," in Proceedings 3rd ITG Conf. Source and Channel Coding, Munich, Germany, Jan. 2000, 5 pages.
ITU-T Recommendation G.992.2 "Splitterless Asymmetric Digital Subscriber Line (ADSL) Transceivers" Jun. 1999.
ITU-T Recommendation G.992.3, "Asymmetric Digital Subscriber Line Transceivers 2 (ADSL2)" International Telecommunication Union, Apr. 2009, 404 pages.
ITU-T Recommendation G.992.3 Annex C, "Annex C: Specific Requirements for an ADSL System Operating in the Same Cable as ISDN as Defined in Appendix III of Recommendation ITU-T G.961" International Telecommunication Union, Apr. 2009, 296 pages.
Johns, David A., et al. "Integrated Circuits for Data Transmission Over Twisted-Pair Channels" IEEE Journal of Solid-State Circuits, vol. 32, Nov. 3, Mar. 1997 (9 pages).
Mestdagh, D.J.G., et al. "A Method to Reduce the Probability of Clipping in DMT-Based Transceivers" IEEE Trans. on Communications, vol. 44, No. 10, Oct. 1996 (5 pages).
Müller, Stefan H. et al. "A Novel Peak Power Reduction Scheme for OFDM" Proc. of the Int. Symposium on Personal, Indoor and Mobile Radio Communications PIMROC '97, pp. 1090-1094, Sep. 1997, Helsinki, Finland (5 pages).
Narahashi et al., "New phasing scheme of N-multiple carriers for reducing peak-to-average power ratio," Electronics Letters, Aug. 1994, vol. 30(17), pp. 1382-1383.
Narahashi, Shoichi, et al. "A New Phasing Scheme for Multitone Signal Systems to Reduce Peak-to-Average Power Ratio" Elecs and Commn's in Japan, Part 1, vol. 80, No. 1. 1997 (11 pages).
Petzold, Mark C. et al. "Multicarrier Spread Spectrum Performance in Fading Channels with Serial Concatenated Convolutional Coding" IEEE 1998 (4 pages).
Scharf, Louis L. "A Vitterbi Algorithm for Modulo-$2\pi$ Phase Tracking in Coherent Data Communication Systems" Department of Electrical Engineering; Office of Naval Research, Public., Dec. 1977 (31 pages).
Sklower, K. et al. "The PPP Multilink Protocol (MP)" Network Working Group, Nov. 1994 (15 pages).
Tellado et al., "Revisiting DMT's Peak-to-Average Ratio," Antwerp, Apr. 20-24, 1998, pp. 1-14.
Tellambura, "A coding technique for reducing peak-to-average power ratio in OFDM," In the Proceedings of Global Telecommunications Conference, IEEE, Nov. 1998, pp. 2783-2787.
Tellambura, "Phase optimisation criterion for reducing peak-to-average power ratio in OFDM," Electronics Letters, Jan. 1998, vol. 34(2), pp. 169-170.
T1.413-1995 "Network and Customer Installation Interfaces—Asymmetric Digital Subscriber Line (ADSL) Metallic Interface" Aug. 18, 1995 (186 pages).
T1.413 Issue 2 "Standards Project for Interfaces Relating to Carrier to Customer Connection of Asymrnetrial Digital Subscriber Line (ADSL) Equipment" Jun. 1, 1998, (287 pages).
T1.413 Issue 2 "Standards Project for Interfaces Relating to Carrier to Customer Connection of Asymmetrial Digital Subscriber Line (ADSL) Equipment" Jun. 5, 1998. (278 pages).
T1.413 Issue 2 "Standards Project for Interfaces Relating to Carrier to Customer Connection of Asymmetrial Digital Subscriber Line (ADSL) Equipment" 1998. (270 pages).
Technical Report—TR-004—Network Migration, Dec. 1997 (58 pages).
Van Eetvelt et al., "Peak to average power reduction for OFDM schemes by selective scrambling," Electronics Letters, Oct. 1996, vol. 32(21), pp. 1963-1964.
Wolman, Alec et al. "Latency Analysis of TCP on an ATM Network" University of Washington, Printed Sep. 19, 2014 (14 pages).
Invitation to Pay Additional Fees for International (PCT) Patent Application No. PCT/US00/30958, dated Mar. 23, 2001.
Invitation to Restrict or to Pay Additional Fees for International (PCT) Patent Application No. PCT/US00/30958, dated Nov. 14, 2001.
Annex to Form PCT/ISA/206 for PCT/US00/30958, dated Mar. 23, 2001; 3 pages.
International Search Report for International (PCT) Patent Application No. PCT/US00/30958, dated Jun. 12, 2001.
International Preliminary Examination Report for International (PCT) Patent Application No. PCT/US00/30958, completed Mar. 4, 2002.
Written Opinion for International (PCT) Patent Application No. PCT/US00/30958, dated Dec. 18, 2001.
Notification of Reasons for Refusal (including translation) for Japanese Patent Application No. 2001-537217, dated Mar. 3, 2008.
Decision of Refusal (including translation) for Japanese Patent Application No. 2001-537217, dated Nov. 4, 2008.
Notice of Preliminary Rejection (translation only) for Korean Patent Application No. 7005830/2002 dated Nov. 22, 2006.
Official Action for U.S. Appl. No. 09/710,310, dated May 4, 2004.
Notice of Allowance for U.S. Appl. No. 09/710,310, dated Jul. 5, 2005.
Notice of Allowance for U.S. Appl. No. 11/211,535, dated Sep. 6, 2007.
Notice of Allowance for U.S. Appl. No. 11/860,080, dated Oct. 17, 2011.
Notice of Allowance for U.S. Appl. No. 13/284,549, dated Mar. 20, 2012.
Notice of Allowance for U.S. Appl. No. 13/439,605, dated Sep. 14, 2012.
Official Action for U.S. Appl. No. 13/718,016, dated May 9, 2013.
Official Action for U.S. Appl. No. 13/718,016, dated Feb. 4, 2014.
Official Action for U.S. Appl. No. 13/718,016, dated Jul. 24, 2014.
Notice of Allowance for U.S. Appl. No. 13/718,016, dated Dec. 5, 2014.
Official Action for U.S. Appl. No. 14/684,737 dated Oct. 22, 2015.
Official Action for U.S. Appl. No. 14/684,737 dated Apr. 6, 2016.
Notice of Allowance for U.S. Appl. No. 14/684,737 dated Aug. 8, 2016.
Office Action for U.S. Appl. No. 15/298,817 dated May 19, 2017.
Official Action for U.S. Appl. No. 11/863,581, dated Feb. 6, 2008.
Notice of Allowance for U.S. Appl. No. 11/863,581, dated Oct. 8, 2008.
Official Action for U.S. Appl. No. 12/255,713, dated Oct. 15, 2009.
Notice of Allowance for U.S. Appl. No. 12/255,713, dated May 18, 2010.
Notice of Allowance for U.S. Appl. No. 12/783,725, dated Nov. 17, 2011.
Official Action for U.S. Appl. No. 13/303,417, dated Jul. 5, 2013.
Notice of Allowance for U.S. Appl. No. 13/303,417, dated Feb. 7, 2014.
Official Action for U.S. Appl. No. 14/256,677 dated Sep. 18, 2014.
Notice of Allowance for U.S. Appl. No. 14/256,677 dated Nov. 17, 2014.

(56) References Cited

OTHER PUBLICATIONS

Office Action for U.S. Appl. No. 14/540,332 dated Mar. 20, 2015.
Office Action for U.S. Appl. No. 14/540,332 dated Jul. 16, 2015.
Office Action for U.S. Appl. No. 14/540,332 dated Feb. 19, 2016.
Office Action for U.S. Appl. No. 14/540,332 dated Apr. 19, 2016.
Office Action for U.S. Appl. No. 14/540,332 dated Dec. 6, 2016.
Notice of Allowance for U.S. Appl. No. 14/540,332 dated Jun. 22, 2017.
Petition for Inter Partes Review of Claims 20 and 26 of U.S. Pat. No. 7,292,627 Under 35 U.S.C. §§ 311-319 and 37 C.F.R. § 42, including Exhibits 1001-1022, Case No. IPR2015-00247, filed Nov. 7, 2014 (786 pages).
TQ Delta LLC's Mandatory Notices Under 37 C.F.R. 42.8(a)(2) for *2Wire, Inc.* v. *TQ Delta, LLC*, United States Patent and Trademark Office—Before the Patent Trial and Appeal Board, Case No. IPR 2015-00247 filed Nov. 26, 2014 (5 pages).
Notice of Filing Date Accorded to Petition and Time for Filing Patent Owner Preliminary Response for *2Wire, Inc.* v. *TQ Delta, LLC*, United States Patent and Trademark Office—Before the Patent Trial and Appeal Board, Case No. IPR 2015-00247 filed Dec. 1, 2014 (4 pages).
Order—Authorization to File a Motion to Correct Filing Date 37 C.F.R. § 42.5 for *2Wire, Inc.* v. *TQ Delta, LLC*, United States Patent and Trademark Office—Before the Patent Trial and Appeal Board, Case No. IPR 2015-00247 filed Dec. 5, 2014 (3 pages).
2Wire, Inc.'s Motion to Correct Filing Date (Including Exhibits 1023-1030) for *2Wire, Inc.* v. *TQ Delta, LLC*, United States Patent and Trademark Office—Before the Patent Trial and Appeal Board, Case No. IPR 2015-00247 filed Dec. 12, 2014 (57 pages).
TQ Delta LLC's Opposition to Petitioner's Motion to Change the Petition Filing Date for *2Wire, Inc.* v. *TQ Delta, LLC*, United States Patent and Trademark Office—Before the Patent Trial and Appeal Board, Case No. IPR 2015-00247 filed Dec. 19, 2014 (7 pages).
Decision—Motion to Correct Filing Date 37 C.F.R § 42.5 for *2Wire, Inc.* v. *TQ Delta, LLC*, United States Patent and Trademark Office—Before the Patent Trial and Appeal Board, Case No. IPR 2015-00247 filed Jan. 15, 2015 (9 pages).
Patent Owner's Preliminary Response for *2Wire, Inc.* v. *TQ Delta, LLC*, United States Patent and Trademark Office—Before the Patent Trial and Appeal Board, Case No. IPR 2015-00247 filed Mar. 2, 2015 (52 pages).
TQ Delta LLC's Supplemental Mandatory Notices Under 37 C.F.R. 42.8(a)(2) for *2Wire, Inc.* v. *TQ Delta, LLC*, United States Patent and Trademark Office—Before the Patent Trial and Appeal Board, Case No. IPR 2015-00247 filed Mar. 2, 2015 (5 pages).
2Wire Inc.'s Supplemental Mandatory Notices for *2Wire, Inc.* v. *TQ Delta, LLC*, United States Patent and Trademark Office—Before the Patent Trial and Appeal Board, Case No. IPR 2015-00247 filed Mar. 31, 2015 (4 pages).
Decision Denying Institution of Inter Partes Review 37 C.F.R. § 42.108 for *2Wire, Inc.* v. *TQ Delta, LLC*, United States Patent and Trademark Office—Before the Patent Trial and Appeal Board, Case No. IPR 2015-00247 filed May 29, 2015 (17 pages).
Petition for Inter Partes Review of Claim 1 of U.S. Pat. No. 7,471,721 Under 35 U.S.C. §§ 311-319 and 37 C.F.R. § 42, including Exhibits 1001-1022, Case No. IPR2015-00239 filed Nov. 7, 2014 (775 pages).
TQ Delta LLC's Mandatory Notices Under 37 C.F.R. 42.8(a)(2) for *2Wire, Inc.* v. *TQ Delta, LLC*, United States Patent and Trademark Office—Before the Patent Trial and Appeal Board, Case No. IPR 2015-00239 filed Nov. 26, 2014 (5 pages).
Notice of Filing Date Accorded to Petition and Time for Filing Patent Owner Preliminary Response for *2Wire, Inc.* v. *TQ Delta, LLC*, United States Patent and Trademark Office—Before the Patent Trial and Appeal Board, Case No. IPR 2015-00239 filed Dec. 1, 2014 (4 pages).
Order—Authorization to File a Motion to Correct Filing Date 37 C.F.R. § 42.5 for *2Wire, Inc.* v. *TQ Delta, LLC*, United States Patent and Trademark Office—Before the Patent Trial and Appeal Board, Case No. IPR 2015-00239 filed Dec. 5 2014 (3 pages).

2Wire, Inc.'s Motion to Correct Filing Date (Including Exhibits 1023-1030) for *2Wire, Inc.* v. *TQ Delta, LLC*, United States Patent and Trademark Office—Before the Patent Trial and Appeal Board, Case No. IPR 2015-00239 filed Dec. 12, 2014 (57 pages).
TQ Delta LLC's Opposition to Petitioner's Motion to Change the Petition Filing Date for *2Wire, Inc.* v. *TQ Delta, LLC*, United States Patent and Trademark Office—Before the Patent Trial and Appeal Board, Case No. IPR 2015-00239 filed Dec. 19, 2014 (7 pages).
Decision—Motion to Correct Filing Date 37 C.F.R § 42.5 for *2Wire. Inc.* v. *TQ Delta, LLC*, United States Patent and Trademark Office—Before the Patent Trial and Appeal Board, Case No. IPR 2015-00239 filed Jan. 15, 2015 (9 pages).
Patent Owner's Preliminary Response for *2Wire, Inc.* v. *TQ Delta, LLC*, United States Patent and Trademark Office—Before the Patent Trial and Appeal Board, Case No. IPR 2015-00239 filed Mar. 2, 2015 (48 pages).
TQ Delta LLC's Supplemental Mandatory Notices Under 37 C.F.R. 42.8(a)(2) for *2Wire, Inc.* v. *TQ Delta, LLC*, United States Patent and Trademark Office—Before the Patent Trial and Appeal Board, Case No. IPR 2015-00239 filed Mar. 2, 2015 (5 pages).
2Wire, Inc.'s Supplemental Mandatory Notices for *2Wire, Inc.* v. *TQ Delta, LLC*, United States Patent and Trademark Office—Before the Patent Trial and Appeal Board, Case No. IPR 2015-00239 filed Mar. 31, 2015 (4 pages).
Decision Denying Institution of Inter Partes Review 37 C.F.R. § 42.108 for *2Wire, Inc.* v. *TQ Delta, LLC*, United States Patent and Trademark Office—Before the Patent Trial and Appeal Board, Case No. IPR 2015-00239 filed May 29, 2015 (15 pages).
Petition for Inter Partes Review of Claims 1 and 14 of U.S. Pat. No. 8,090,008 Under 35 U.S.C. § 311-319 and 37 C.F.R. § 42, including Exhibits 1001-1021, Case No. IPR2015-00240, filed Nov. 7, 2014 (830 pages).
TQ Delta LLC's Mandatory Notices Under 37 C.F.R 42.8(a)(2) for *2Wire, Inc.* v. *TQ Delta, LLC*, United States Patent and Trademark Office—Before the Patent Trial and Appeal Board, Case No. IPR 2015-00240 filed Nov. 26, 2014 (5 pages).
Notice of Filing Date Accorded to Petition and Time for Filing Patent Owner Preliminary Response for *2Wire, Inc.* v. *TQ Delta, LLC*, United States Patent and Trademark Office—Before the Patent Trial and Appeal Board, Case No. IPR 2015-00240 filed Dec. 1, 2014 (4 pages).
Order: Authorization to File a Motion to Correct Filing Date 37 C.F.R. § 42.5 for *2Wire, Inc.* v. *TQ Delta, LLC*, United States Patent and Trademark Office—Before the Patent Trial and Appeal Board, Case No. IPR 2015-00240 filed Dec. 5, 2014 (3 pages).
2Wire, Inc.'s Motion to Correct Filing Date for *2Wire, Inc.* v. *TQ Delta, LLC*, United States Patent and Trademark Office—Before the Patent Trial and Appeal Board, Case No. IPR 2015-00240 filed Dec. 12, 2014 (57 pages).
TQ Delta LLC's Opposition to Petitioner's Motion to Change the Petition Filing Date for *2Wire, Inc.* v. *TQ Delta, LLC*, United States Patent and Trademark Office—Before the Patent Trial and Appeal Board, Case No. IPR 2015-00240 filed Dec. 19, 2014 (7 pages).
Decision: Motion to Correct Filing Date 37 C.F.R. § 42.5 for *2Wire, Inc.* v. *TQ Delta, LLC*, United States Patent and Trademark Office—Before the Patent Trial and Appeal Board, Case No. IPR 2015-00240 filed Jan. 15, 2015 (9 pages).
Patent Owner's Preliminary Response for *2Wire, Inc.* v. *TQ Delta, LLC*, United States Patent and Trademark Office—Before the Patent Trial and Appeal Board, Case No. IPR 2015-00240 filed Mar. 2, 2015 (56 pages).
TQ Delta LLC's Supplemental Mandatory Notices Under 37 C.F.R. 42.8(a)(2) for *2Wire, Inc.* v. *TQ Delta, LLC*, United States Patent and Trademark Office—Before the Patent Trial arid Appeal Board, Case No. IPR 2015-00240 filed Mar. 2, 2015 (5 pages).
2Wire, Inc.'s Supplemental Mandatory Notices for *2Wire, Inc.* v. *TQ Delta, LLC*, United States Patent and Trademark Office—Before the Patent Trial and Appeal Board, Case No. IPR 2015-00240 filed Mar. 31, 2015 (4 pages).
Decision Denying Institution of Inter Partes Review 37 C.F.R. § 42.108 for *2Wire, Inc.* v. *TQ Delta, LLC*, United States Patent and Trademark Office—Before the Patent Trial and Appeal Board, Case No. IPR 2015-00240 filed May 29, 2015 (16 pages).

(56) References Cited

OTHER PUBLICATIONS

Petition for Inter Partes Review of Claims 1 and 14 of U.S. Pat. No. 8,073,041 Under 35 U.S.C. §§ 311-319 and 37 C.F.R. § 42, including Exhibits 1001-1022, Case No. IPR2015-00241, filed Nov. 7, 2014 (815 pages).
TQ Delta LLC's Mandatory Notices Under 37 C.F.R. 42.8(a)(2) for 2Wire, Inc. v. TQ Delta, LLC, United States Patent and Trademark Office—Before the Patent Trial and Appeal Board, Case No. IPR 2015-00241 filed Nov. 26, 2014 (5 pages).
Notice of Filing Date Accorded to Petition and Time for Filing Patent Owner Preliminary Response for 2Wire, Inc. v. TQ Delta, LLC, United States Patent and Trademark Office—Before the Patent Trial and Appeal Board, Case No. IPR 2015-00241 filed Dec. 1, 2014 (4 pages).
Order: Authorization to File a Motion to Correct Filing Date 37 C.F.R. § 42.5 for 2Wire, Inc. v. TQ Delta, LLC, United States Patent and Trademark Office—Before the Patent Trial and Appeal Board, Case No. IPR 2015-00241 filed Dec. 5, 2014 (3 pages).
2Wire, Inc.'s Motion to Correct Filing Date for 2Wire, Inc. v. TQ Delta, LLC, United States Patent and Trademark Office—Before the Patent Trial and Appeal Board, Case No. IPR 2015-00241 filed Dec. 12, 2014 (57 pages).
TQ Delta LLC's Opposition to Petitioner's Motion to Change the Petition Filing Date for 2Wire, Inc. v. TQ Delta, LLC, United States Patent and Trademark Office—Before the Patent Trial and Appeal Board, Case No. IPR 2015-00241 filed Dec. 19, 2014 (7 pages).
Decision: Motion to Correct Filing Date 37 C.F.R. § 42.5 for 2Wire, Inc. v. TQ Delta, LLC, United States Patent and Trademark Office—Before the Patent Trial and Appeal Board, Case No. IPR 2015-00241 filed Jan. 15, 2015 (9 pages).
Patent Owner's Preliminary Response for 2Wire, Inc. v. TQ Delta, LLC, United States Patent and Trademark Office—Before the Patent Trial and Appeal Board, Case No. IPR 2015-00241 filed Mar. 2, 2015 (52 pages).
TQ Delta LLC's Supplemental Mandatory Notices Under 37 C.F.R. 42.8 (a)(2) for 2Wire, Inc. v. TQ Delta, LLC, United States Patent and Trademark Office—Before the Patent Trial and Appeal Board, Case No. IPR 2015-00241 filed Mar. 2, 2015 (5 pages).
2Wire, Inc.'s Supplemental Mandatory Notices for 2Wire, Inc. v. TQ Delta, LLC, United States Patent and Trademark Office—Before the Patent Trial and Appeal Board, Case No. IPR 2015-00241 filed Mar. 31, 2015 (4 pages).
Decision Denying Institution of Inter Partes Review 37 C.F.R. § 42.108 for 2Wire, Inc. v. TQ Delta, LLC, United States Patent and Trademark Office—Before the Patent Trial and Appeal Board, Case No. IPR 2015-00241 filed May 29, 2015 (18 pages).
Petition for Inter Partes Review of Claims 1, 6, 7, and 31 of U.S. Pat. No. 8,218,610 Under 35 U.S.C. §§ 311-319 and 37 C.F.R. § 42, including Exhibits 1001-1021, Case No. IPR2015-00242, filed Nov. 7, 2014 (882 pages).
TQ Delta LLC's Mandatory Notices Under 37 C.F.R. 42.8(a)(2) for 2Wire, Inc. v. TQ Delta, LLC, United States Patent and Trademark Office—Before the Patent Trial and Appeal Board, Case No. IPR 2015-00242 filed Nov. 26, 2014 (5 pages).
Notice of Filing Date Accorded to Petition and Time for Filing Patent Owner Preliminary Response for 2Wire, Inc. v. TQ Delta, LLC, United States Patent and Trademark Office—Before the Patent Trial and Appeal Board, Case No. IPR 2015-00242 filed Dec. 1, 2014 (4 pages).
Order: Authorization to File a Motion to Correct Filing Date 37 C.F.R. § 42.5 for 2Wire, Inc. v. TQ Delta, LLC, United States Patent and Trademark Office—Before the Patent Trial and Appeal Board, Case No. IPR 2015-00242 filed Dec. 5, 2014 (3 pages).
2Wire, Inc.'s Motion to Correct Filing Date for 2Wire, Inc. v. TQ Delta, LLC, United States Patent and Trademark Office—Before the Patent Trial and Appeal Board, Case No. IPR 2015-00242 filed Dec. 12, 2014 (57 pages).
TQ Delta LLC's Opposition to Petitioner's Motion to Change the Petition Filing Date for 2Wire, Inc. v. TQ Delta, LLC, United States Patent and Trademark Office—Before the Patent Trial and Appeal Board, Case No. IPR 2015-00242 filed Dec. 19, 2014 (7 pages).
Decision: Motion to Correct Filing Date 37 C.F.R. § 42.5 for 2Wire, Inc. v. TQ Delta, LLC, United States Patent and Trademark Office—Before the Patent Trial and Appeal Board, Case No. IPR 2015-00242 filed Jan. 15, 2015 (9 pages).
Patent Owner's Preliminary Response for 2Wire, Inc. v. TQ Delta, LLC, United States Patent and Trademark Office—Before the Patent Trial and Appeal Board, Case No. IPR 2015-00242 filed Mar. 2, 2015 (62 pages).
TQ Delta LLC's Supplemental Mandatory Notices Under 37 C.F.R. 42.8(a)(2) for 2Wire, Inc. v. TQ Delta, LLC, United States Patent and Trademark Office—Before the Patent Trial and Appeal Board, Case No. IPR 2015-00242 filed Mar. 2, 2015 (5 pages).
2Wire, Inc.'s Supplemental Mandatory Notices for 2Wire, Inc. v. TQ Delta, LLC, United States Patent and Trademark Office—Before the Patent Trial and Appeal Board. Case No. IPR 2015-00242 filed Mar. 31, 2015 (4 pages).
Decision Denying Institution of Inter Partes Review C.F.R. § 42.108 for 2Wire, Inc. v. TQ Delta, LLC, United States Patent and Trademark Office—Before the Patent Trial and Appeal Board, Case No. IPR 2015-00242 filed May 29, 2015 (17 pages).
Petition for Inter Partes Review of Claims 1, 6, 7, and 29 of U.S. Pat. No. 8,355,427 Under 35 U.S.C. §§ 311-319 and 37 C.F.R. § 42, including Exhibits 1001-1022, Case No. IPR2015-00243, filed Nov. 7, 2014 (909 pages).
TQ Delta LLC's Mandatory Notices Under 37 C.F.R. 42.8(a)(2) for 2Wire, Inc. v. TQ Delta, LLC, United States Patent and Trademark Office—Before the Patent Trial and Appeal Board, Case No. IPR 2015-00243 filed Nov. 26, 2014 (5 pages).
Notice of Filing Date Accorded to Petition and Time for Filing Patent Owner Preliminary Response for 2Wire, Inc. v. TQ Delta, LLC, United States Patent and Trademark Office—Before the Patent Trial and Appeal Board, Case No. IPR 2015-00243 filed Dec. 1, 2014 (4 pages).
Order: Authorization to File a Motion to Correct Filing Date 37 C.F.R. § 42.5 for 2Wire, Inc. v. TQ Delta, LLC, United States Patent and Trademark Office—Before the Patent Trial and Appeal Board, Case No. IPR 2015-00243 filed Dec. 5, 2014 (3 pages).
2Wire, Inc.'s Motion to Correct Filing Date for 2Wire. Inc. v. TQ Delta, LLC, United States Patent and Trademark Office—Before the Patent Trial and Appeal Board, Case No. IPR 2015-00243 filed Dec. 12, 2014 (57 pages).
TQ Delta LLC's Opposition to Petitioner's Motion to Change the Petition Filing Date for 2Wire, Inc. v. TQ Delta, LLC, United States Patent and Trademark Office—Before the Patent Trial and Appeal Board, Case No. IPR 2015-00243 filed Dec. 19, 2014 (7 pages).
Decision: Motion to Correct Filing Date 37 C.F.R. § 42.5 for 2Wire, Inc. v. TQ Delta, LLC, United States Patent and Trademark Office—Before the Patent Trial and Appeal Board, Case No. IPR 2015-00243 filed Jan. 15, 2015 (9 pages).
Patent Owner's Preliminary Response for 2Wire, Inc. v. TQ Delta, LLC, United States Patent and Trademark Office—Before the Patent Trial and Appeal Board, Case No. IPR 2015-00243 filed Mar. 2, 2015 (61 pages).
TQ Delta LLC's Supplemental Mandatory Notices Under 37 C.F.R. 42.8(a)(2) for 2Wire, Inc. v. TQ Delta, LLC, United States Patent and Trademark Office—Before the Patent Trial and Appeal Board, Case No. IPR 2015-00243 filed Mar. 2, 2015 (5 pages).
2Wire, Inc.'s Supplemental Mandatory Notices for 2Wire, Inc. v. TQ Delta, LLC, United States Patent and Trademark Office—Before the Patent Trial and Appeal Board, Case No. IPR 2015-00243 filed Mar. 31, 2015 (4 pages).
Decision Denying Institution of Inter Partes Review 37 C.F.R. § 42.108 for 2Wire, Inc. v. TQ Delta, LLC, United States Patent and Trademark Office—Before the Patent Trial and Appeal Board, Case No. IPR 2015-00243 filed May 29, 2015 (18 pages).
Petition for inter Partes Review of U.S. Pat. No. 9,014,243, including Exhibits 1001-1018, Case No. IPR2016-01020, filed May 6, 2016 (2745 pages).

(56) References Cited

OTHER PUBLICATIONS

Notice of Filing Date Accorded to Petition and Time for Filing Patent Owner Preliminary Response for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed May 12, 2016 (5 pages).
Patent Owner's Mandatory Notices Pursuant to 37 C.F.R. § 42.8(a)(2) for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed May 27, 2016 (5 pages).
Patent Owner's Preliminary Response for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Aug. 12, 2016 (53 pages).
Decision Institution of Inter Partes Review 37 C.F.R. § 42.108 for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Nov. 4, 2016 (17 pages).
Scheduling Order for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Nov. 4, 2016 (9 pages).
Joint Stipulation to Move Due Dates 1 and 2 for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jan. 9, 2017 (3 pages).
Petitioner Cisco Systems, Inc.'s Updated Mandatory Notices for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jan. 25, 2017 (4 pages).
Notice of Deposition of Dr. Jose Tellado for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jan. 25, 2017 (3 pages).
Petitioner's Reply for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 8, 2017 (522 pages).
Second Notice of Deposition of Dr. Jose Tellado for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 13, 2017 (4 pages).
Petitioner Cisco Systems, Inc.'s Updated Mandatory Notices for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 14, 2017 (3 pages).
Patent Owner's Objections to Evidence Pursuant to 37 C.F.R. § 42.64(b)(1) for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 15, 2017 (6 pages).
Order—Conduct of the Proceeding for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 22, 2017 (5 pages).
Patent Owner's Listing of Improper Reply / New Argument and Evidence for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 27, 2017 (112 pages).
Petitioner's Updated Exhibit List for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 28, 2017 (5 pages).

Petitioner's Request for Oral Hearing for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 30, 2017 (4 pages).
Patent Owner's Motion for Observation Regarding Cross-Examination of Dr. Jose Tellado for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 30, 2017 (16 pages).
Patent Owner's Motion to Exclude Exhibits 1022, 1023, 1024, 1028, and 1028, Portions of the Tellado Testimony (EX. 2013), and Portions of the 2nd Tellado Declaration (EX. 1026) Pursuant to 37 C.F.R. § 42.64(c) for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 30, 2017 (15 pages).
Patent Owner's Request for Oral Argument for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jun. 30, 2017 (5 pages).
Petitioner's Itemized Listing Pursuant to Paper 21 for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jul. 3, 2017 (5 pages).
Order—Authorization to File Motion for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jul. 7, 2017 (3 pages).
Patent Owner's Motion for Discovery Filed Under 37 C.F.R. § 42.51(b) for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jul. 14, 2017 (30 pages).
Petitioner's Opposition to Patent Owner's Motion to Exclude for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jul. 14, 2017 (17 pages).
Petitioner's Response to Patent Owner's Motion for Observation on Cross-Examination for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jul. 14, 2017 (12 pages).
Order—Trial Hearing Order for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jul. 20, 2017 (7 pages).
Patent Owner's Response Under 37 CFR § 42.120 for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Feb. 24, 2017 (2489 pages).
Patent Owner's Exhibit List for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Feb. 24, 2017 (4 pages).
Decision Institution of Inter Partes Review and Motion for Joinder in corresponding case No. IPR2017-00254 in *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Feb. 27, 2017 (8 pages).
Decision Institution of Inter Partes Review and Motion for Joinder in corresponding case No. IPR2017-00418 in *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Apr. 3, 2017 (9 pages).
Petitoiner's Notice of Taking Deposition of Dr. Robert Short for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Apr. 18, 2017 (3 pages).

(56) References Cited

OTHER PUBLICATIONS

Petition for Inter Partes Review of U.S. Pat. No. 8,718,158, including Exhibits 1001-1020, Case No. IPR2016-01021, filed May 6, 2016 (2742 pages).
Notice of Filing Date Accorded to Petition and Time for Filing Patent Owner Preliminary Response for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed May 12, 2016 (5 pages).
Patent Owner's Mandatory Notices Pursuant to 37 C.F.R. § 42.8(a)(2) for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed May 27, 2016 (5 pages).
Patent Owner's Preliminary Response for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Aug. 12, 2016 (55 pages).
Decision Institution of Inter Partes Review 37 C.F.R. § 42.108 for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Nov. 4, 2016 (21 pages).
Scheduling Order for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Nov. 4, 2016 (9 pages).
Joint Stipulation to Move Due Dates 1 and 2 for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jan. 9, 2017 (3 pages).
Petitioner Cisco Systems, Inc.'s Updated Mandatory Notices for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jan. 25, 2017 (4 pages).
Notice of Deposition of Dr. Jose Tellado for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jan. 25, 2017 (4 pages).
Corrected Notice of Deposition of Dr. Jose Tellado for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jan. 25, 2017 (4 pages).
Decision—Institution of Inter Partes Review and Petitoiners Motion for Joinder for corresponding Case No. IPR2017-00255 in *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Feb. 14, 2017 (8 pages).
Petitioner's Updated Mandatory Notice for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Feb. 20, 2017 (3 pages).
Patent Owner's Response Under 37 CFR § 42.120 for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Feb. 24, 2017 (2491 pages).
Patent Owner's Response Under 37 CFR § 42.120 for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Feb. 24, 2017 (5 pages).
Corrected Patent Owner's Exhibit List for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Feb. 27, 2017 (5 pages).
Decision—Institution of Inter Partes Review and Petitioner's Motion for Joinder for corresponding Case No. IPR2017-00417 in *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Apr. 3, 2017 (9 pages).

Petitioner's Notice of Taking Deposition of Dr. Robert Short for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Apr. 18, 2017 (3 pages).
Petitioner's Reply for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 8, 2017 (522 pages).
Second Notice of Deposition of Dr. Jose Tellado for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 13, 2017 (4 pages).
Petitioner's Updated Mandatory Notices for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 14, 2017 (3 pages).
Patent Owner's Objections to Evidence Pursuant to 37 C.F.R. § 42.64(b)(1) for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 15, 2017 (6 pages).
Order—Conduct of the Proceeding for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 22, 2017 (5 pages).
Patent Owner's Listing of Improper Reply / New Argument and Evidence for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 27, 2017 (112 pages).
Petitioner's Updated Exhibit List for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 28, 2017 (5 pages).
Petitioner's Request for Oral Hearing for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 30, 2017 (4 pages).
Patent Owner's Motion for Observation Regarding Cross-Examination of Dr. Jose Tellado for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 30, 2017 (16 pages).
Patent Owner's Motion to Exclude Exhibits 1022, 1023, 1024, 1025, and 1028, Portions of the Tellado Testimony (EX. 2013), and Portions of the 2nd Tellado Declaration (EX. 1026) Pursuant to 37 C.F.R. § 42.84(c) for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 30, 2017 (14 pages).
Patent Owner's request for Oral Argument for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jun. 30, 2017 (5 pages).
Petitioner's Itemized Listing Pursuant to Paper 24 for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jul. 3, 2017 (5 pages).
Order—Authorization to File Motion for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jul. 7, 2017 (3 pages).
Patent Owner's Motion for Discovery Filed Under 37 C.F.R. § 42.51 (b) for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jul. 14, 2017 (30 pages).
Petitioner's Opposition to Patent Owner's Motion to Exclude for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jul. 14. 2017 (17 pages).

(56) References Cited

OTHER PUBLICATIONS

Petitioner's Response to Patent Owner's Motion for Observation on Cross-Examination for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jul. 14, 2017 (12 pages).
Order—Trial Hearing Order for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jul. 20, 2017 (7 pages).
Petition for Inter Partes Review of U.S. Pat. No. 9,014,243, including Exhibits 1001-1018, Case No. IPR2017-00254, filed Nov. 11, 2016 (2767 pages).
Motion for Joinder for *DISH Network, LLC* v. *TQ Delta, LLC*, United States Patent and Trademark Office—Before the Patent Trial and Appeal Board, Case No. IPR 2017-00254 (U.S. Pat. No. 9,014,243) filed Nov. 11, 2016 (6 pages).
Notice of Filing Date Accorded to Petition and Time for Filing Patent Owner Preliminary Response for *DISH Network, LLC* v. *TQ Delta, LLC*, United States Patent and Trademark Office—Before the Patent Trial and Appeal Board, Case No. IPR 2017-00254 (U.S. Pat. No. 9,014,243) filed Dec. 2, 2016 (5 pages).
Patent Owner's Mandatory Notices Pursuant to 37 C.F.R § 42.8(a)(2) for *DISH Network, LLC* v. *TQ Delta, LLC*, United States Patent and Trademark Office—Before the Patent Trial and Appeal Board, Case No. IPR 2017-00254 (U.S. Pat. No. 9,014,243) filed Dec. 2, 2016 (9 pages).
Patent Owner's Statement of Non-Opposition to Motion for Joinder and Waiver of Preliminary Response for *DISH Network, LLC* v. *TQ Delta, LLC*, United States Patent and Trademark Office—Before the Patent Trial and Appeal Board, Case No. IPR 2017-00254 (U.S. Pat. No. 9,014,243) filed Dec. 13, 2016 (3 pages).
Petitioner's Motion for Pro Hac Vice Admission Under 37 C.F.R. 41.10(c) for *DISH Network, LLC* v. *TQ Delta, LLC*, United States Patent and Trademark Office—Before the Patent Trial and Appeal Board, Case No. IPR 2017-00254 (U.S. Pat. No. 9,014,243) filed Jan. 10, 2017 (12 pages).
Order—Motion for Pro Hac Vice Admission for *DISH Network, LLC* V. *TQ Delta, LLC*, United States Patent and Trademark Office—Before the Patent Trial and Appeal Board, Case No. IPR 2017-00254 (U.S. Pat. No. 9,014,243) filed Feb. 7, 2017 (4 pages).
Pefitoiner's Updated Mandatory Notice for *DISH Network, LLC* v. *TQ Delta, LLC*, United States Patent and Trademark Office—Before the Patent Trial and Appeal Board, Case No. IPR 2017-00254 (U.S. Pat. No. 9,014,243) filed Feb. 9, 2017 (3 pages).
Decision—Institution of Inter Partes Review and Petitioner's Motion for Joinder for *DISH Network, LLC* v. *TQ Delta, LLC*, United States Patent and Trademark Office—Before the Patent Trial and Appeal Board, Case No. IPR 2017-00254 (U.S. Pat. No. 9,014,243) filed Feb. 27, 2017 (8 pages).
Petition for Inter Partes Review of U.S. Pat. No. 8,718,158, including Exhibits 1001-1020, Case No. IPR2017-00255, filed Nov. 11, 2016 (2549 pages).
Motion for Joinder for *DISH Network, LLC* v. *TQ Delta, LLC*, United States Patent and Trademark Office—Before the Patent Trial and Appeal Board, Case No. IPR 2017-00255 (U.S. Pat. No. 8,718,158) filed Nov. 11, 2016 (6 pages).
Notice of Filing Date Accorded to Petition and Time for Filing Patent Owner Preliminary Response for *DISH Network, LLC* v. *TQ Delta, LLC*, United States Patent and Trademark Office—Before the Patent Trial and Appeal Board, Case No. IPR 2017-00255 (U.S. Pat. No. 8,718,158) filed Dec. 2, 2016 (5 pages).
Patent Owner's Mandatory Notices Pursuant to 37 C.F.R § 42.8(a)(2) for *DISH Network, LLC* v. *TQ Delta, LLC*, United States Patent and Trademark Office—Before the Patent Trial and Appeal Board, Case No. IPR 2017-00255 (U.S. Pat. No. 8,718,158) filed Dec. 2, 2016 (8 pages).
Patent Owner's Statement of Non-Opposition to Motion for Joinder and Waiver of Preliminary Response for *DISH Network, LLC* v. *TQ Delta, LLC*, United States Patent and Trademark Office—Before the Patent Trial and Appeal Board, Case No. IPR 2017-00255 (U.S. Pat. No. 8,718,158) filed Dec. 13, 2016 (3 pages).
Petitioner's Motion for Pro Hac Vice Admission Under 37 C.F.R. 41.10 (c) for *DISH Network, LLC* v. *TQ Delta, LLC*, United States Patent and Trademark Office—Before the Patent Trial and Appeal Board, Case No. IPR 2017-00255 (U.S. Pat. No. 8,718,158) filed Jan. 10, 2017 (12 pages).
Decision Institution of inter Partes Review 37 C.F.R. 42.108 and Petitioner's Motion for Joinder 37 C.F.R. 42.122(b) for *DISH Network, LLC* v. *TQ Delta, LLC*, United States Patent and Trademark Office—Before the Patent Trial and Appeal Board, Case No. IPR 2017-00255 (U.S. Pat. No. 8,718,158) filed Jan. 19, 2017 (8 pages).
Order—Motion for Pro Hac Vice Admission for *DISH Network, LLC* v. *TQ Delta, LLC*, United States Patent and Trademark Office—Before the Patent Trial and Appeal Board, Case No. IPR 2017-00255 (U.S. Pat. No. 8,718,158) filed Feb. 7, 2017 (4 pages).
Petition for Inter Partes Review of U.S. Pat. No. 8,718,158 including Exhibits 1001-1020, Case No. IPR2017-00417, filed Dec. 5, 2016 (2549 pages).
Motion for Joinder for *Comcast Cable Communications, LLC, et al.* v. *TQ Delta, LLC*, United States Patent and Trademark Office—Before the Patent Trial and Appeal Board, Case No. IPR 2017-00417 (U.S. Pat. No. 8,718,158) filed Dec. 5, 2016 (10 pages).
Notice of Filing Date Accorded to Petition and Time for Filing Patent Owner Preliminary Response for *Comcast Cable Communications, LLC, et al.* v. *TQ Delta, LLC*, United States Patent and Trademark Office—Before the Patent Trial and Appeal Board, Case No. IPR 2017-00417 (U.S. Pat. No. 8,718,158) filed Dec. 21, 2016 (5 pages).
Patent Owner's Mandatory Notices Pursuant to 37 C.F.R § 42.8(a)(2) for *Comcast Cable Communications, LLC, et al.* v. *TQ Delta, LLC*, United States Patent and Trademark Office—Before the Patent Trial and Appeal Board, Case No. IPR 2017-00417 (U.S. Pat. No. 8,718,158) filed Dec. 22, 2016 (9 pages).
TQ Delta LLC's Power of Attorney for *Comcast Cable Communications, LLC, et al.* v. *TQ Delta, LLC*, United States Patent and Trademark Office—Before the Patent Trial and Appeal Board, Case No. IPR 2017-00417 (U.S. Pat. No. 8,718,58) filed Dec. 27, 2016 (3 pages).
Patent Owner's Statement of Non-Opposition to Motion for Joinder and Waiver of Preliminary Response for *Comcast Cable Communications, LLC, et al.* v. *TQ Delta, LLC*United States Patent and Trademark Office—Before the Patent Trial and Appeal Board, Case No. IPR 2017-00417 (U.S. Pat. No. 8,718,158) filed Jan. 27, 2017 (3 pages).
Decision—Institution of Inter Partes Review and Petitioner's Motion for Joinder for *Comcast Cable Communications, LLC, et al.* v. *TQ Delta, LLC*, United States Patent and Trademark Office—Before the Patent Trial and Appeal Board, Case No. IPR 2017-00417 (U.S. Pat. No. 8,718,168) filed Apr. 3, 2017 (9 pages).
Petition for Inter Partes Review of U.S. Pat. No. 9,014,243 including Exhibits 1001-1018, Case No. IPR2017-00418, filed Dec. 5, 2016 (2752 pages).
Motion for Joinder for *Comcast Cable Communications, LLC, et al.* v. *TQ Delta, LLC*, United States Patent and Trademark Office—Before the Patent Trial and Appeal Board, Case No. IPR 2017-00418 (U.S. Pat. No. 9,014,243) filed Dec. 5, 2016 (10 pages).
Notice of Filing Date Accorded to Petition and Time for Filing Patent Owner Preliminary Response for *Comcast Cable Communications, LLC, et al.* v. *TQ Delta, LLC*, United States Patent and Trademark Office—Before the Patent Trial and Appeal Board, Case No. IPR 2017-00418 (U.S. Pat. No. 9,014,243) filed Dec. 21, 2016 (5 pages).
Patent Owner's Mandatory Notices Pursuant to 37 C.F.R § 42.8(a)(2) for *Comcast Cable Communications, LLC, et al.* v. *TQ Delta, LLC*, United States Patent and Trademark Office—Before the Patent Trial and Appeal Board, Case No. IPR 2017-00418 (U.S. Pat. No. 9,014,243) filed Dec. 22, 2016 (9 pages).
Patent Owner's Statement of Non-Opposition to Motion for Joinder and Waiver of Preliminary Response for *Comcast Cable Communications, LLC, et al.* v. *TQ Delta, LLC*, United States Patent and Trademark Office—Before the Patent Trial and Appeal Board, Case No. IPR 2017-00418 (U.S. Pat. No. 9,014,243) filed Jan. 27, 2017 (3 pages).

(56) References Cited

OTHER PUBLICATIONS

Decision—Institution of Inter Partes Review and Petitioner's Motion for Joinder for *Comcast Cable Communications, LLC, et al.* v. *TQ Delta, LLC*, United States Patent and Trademark Office—Before the Patent Trial and Appeal Board, Case No. IPR 2017-00418 (U.S. Pat. No. 9,014,243) filed Apr. 3, 2017 (9 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Nov. 4, 2013-Oct. 19, 2015—Docket Nos. 1-122; (3,844 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Nov. 10, 2015-Jan. 5, 2016—Docket Nos. 123-129; (102 pages).
Documents filed with District Court Proceedings for *TQ Delta, LLC* v. *2WIRE, Inc.*; U.S. District Court, for the District of Delaware (Wilmington); Civil Action No, 1:13-cv-01835-RGA; Includes documents filed from Jan. 20, 2016-Feb. 2, 2016—Docket Nos. 131-137; (104 pages).
Documents filed with District Court Proceedings for *TQ Delta, LLC* v. *2WIRE, Inc.*; U.S. District Court, for the District of Delaware (Wilmington); Civil Action No, 1:13-cv-01835-RGA; Includes documents filed from Feb. 9, 2016-Mar. 2, 2016—Docket Nos. 138-157; (228 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Aug. 31, 2015 and Mar. 17, 2016-Apr. 22, 2016—Docket Nos. 108 and 108-208; (194 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed on Feb. 25, 2016, mailed publically available on May 25, 2016 Docket No. 155 (40 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Apr. 27, 2016-May 24, 2016; Docket Nos. 209-226; (813 pages).
Documents filed with District Court Proceedings for *TQ Delta, LLC* v. *2WIRE, Inc.*; U.S. District Court, for the District of Delaware (Wilmington); Civil Action No, 1:13-cv-01835-RGA; Includes documents filed on Mar. 6, 2016—made publically available Jun. 1, 2016 Docket Nos. 158; (61 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Jun. 3, 2016-Jun. 6, 2016; Docket Nos. 227-228; (67 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed on Jun. 27, 2016; Docket Nos. 229; (2 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed on Aug. 2-Sep. 14, 2016; Docket Nos. 230-236; (58 pages).
Documents filed with District Court Proceedings for *TQ Delta, LLC* v. *2WIRE, Inc.*; U.S. District Court, for the District of Delaware (Wilmington); Civil Action No, 1:13-cv-01835-RGA; Includes documents filed on Sep. 26, 2016; Docket Nos. 238-239; (19 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Oct. 26, 2016-Nov. 17, 2016; Docket Nos. 240-245; (37 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed on Sep. 18, 2016 and made available on Dec. 19, 2016 Docket No. 237; (36 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed From Dec. 9, 2016-Feb. 3, 2017; Docket Nos. 246-265; (688 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed made available on Dec. 19, 2016; Docket No. 237; (36 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Feb. 6, 2017 to May 1, 2017; Docket Nos. 266-286; (124 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed on Feb. 10, 2017, made available on May 11, 2017; Docket Nos. 269; (52 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from May 2, 2017 to Jul. 14, 2017; Docket Nos. 287-335; (1183 pages).
Defendant 2WIRE, Inc.'s Preliminary Invalidity Contentions with Regard to Representative Asserted Claims for *TQ Delta, LLC* v. *2WIRE, Inc.*—Including Claim Charts for Family 4 with Exhibits H-1 to H-11 and I-1 to I-11; In the United States District Court for the District of Delaware; Civil Action No. 13-01835-RGA; filed Sep. 24, 2015 (438 pages).
Defendant 2WRE, Inc.'s Invalidity Contentions in Response to TQ Delta's Dec. 8, 2016 Final Infringement Contentions for *TQ Delta, LLC* v. *2WIRE, Inc.*—Including Claim Charts for Family 4 with Exhibits H-1 to H-19 and I-1 to I-19; In the United States District Court for the District of Delaware; Civil Action No. 13-01835-RGA; filed Jan. 23, 2017 (1482 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed from Nov. 4, 2013-Nov. 30, 2015—Docket Nos. 1-100; (1722 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed from Dec. 16, 2015-Jan. 6, 2016—Docket Nos. 104-112; (193 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed from Jan. 20, 2016-Feb. 8, 2016—Docket Nos. 113-124; (252 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed from Feb. 9, 2016-Mar. 2, 2016—Docket Nos. 125-142; (225 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed from Mar. 17, 2016-Apr. 22, 2016; Docket Nos. 165-193; (152 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed on Feb. 25, 2016, made publically available May 25, 2016; Docket No. 140; (40 pages).

(56) References Cited

OTHER PUBLICATIONS

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Apr. 27, 2016-May 24, 2016; Docket Nos. 194-211; (813 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Mar. 3, 2016 made publically available Jun. 1, 2016; Docket Nos. 143; (61 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Jun. 3, 2016-Jun. 7, 2016; Docket Nos. 212-215; (138 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Jun. 27, 2016; Docket Nos. 216; (2 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Aug. 2-Aug. 23, 2016; Docket Nos. 217-219; (9 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Sep. 16, 2016; Docket Nos. 220; (2 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Sep. 26, 2016; Docket Nos. 221-222; (19 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Oct. 26, 2016-Nov. 17, 2016; Docket Nos. 223-227; (35 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Dec. 9, 2016-Feb. 3, 2017; Docket Nos. 228-236; (21 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Feb. 8, 2017 to Apr. 26, 2017; Docket Nos. 237-253; (118 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Feb. 10, 2017, made available on May 11, 2017; Docket Nos. 239; (52 pages).

Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed May 2, 2017 to Jul. 14, 2017; Docket Nos. 254-299; (1080 pages).

Defendant Zhone Technologies, Inc.'s Invalidity Contentions with Regard to Representative Asserted Claims for *TQ Delta, LLC v. Zhone Technologies Inc.*—Including Claim Charts for Family 4 with Exhibits 80-101; In the United States District Court for the District of Delaware; Civil Action No. 13-01836-RGA; filed Sep. 25, 2015 (375 pages).

Defendant Zhone Technologies, Inc.'s Final Invalidity Contentions in Response to Plaintiffs Final Infringement Charts Regarding Non-Broadcom Products for *TQ Delta, LLC v. Zhone Technologies Inc.*—Including Claim Charts for Family 4 with Exhibits 95-132; In the United States District Court for the District of Delaware; Civil Action No. 13-01836-RGA; filed Jan. 23, 2017 (1314 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 9, 2013-Nov. 30, 2015—Docket Nos. 1-117; (1996 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 16, 2015-Dec. 16, 2015—Docket Nos. 119; (48 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jan. 20, 2016-Feb. 8, 2016—Docket Nos. 125-139; (349 pages).

Documents filed with District Court Proceedings for *TQ Delta, LLC v. Zyxel Communications Inc. et al.*; U.S. District Court, for the District of Delaware (Wilmington); Civil Action No, 1:13-cv-02013-RGA; includes documents filed from Feb. 9, 2016-Mar. 2, 2016; Docket Nos. 140-157; (223 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Mar. 17, 2016-Apr. 22, 2016; Docket Nos. 180-208; (152 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Feb. 25, 2016, made publically available May 25, 2016; Docket No. 155; (40 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Apr. 27, 2016-May 24, 2016; Docket Nos. 209-226; (809 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Mar. 3, 2016, made publically Jun. 1, 2016; Docket No. 158; (61 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 3, 2016-Jun. 13, 2016; Docket Nos. 227-232; (140 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 14, 2016; Docket Nos. 233; (2 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Jun. 27, 2016; Docket Nos. 235; (2 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Aug. 2, 2016-Sep. 1, 2016; Docket Nos. 236-239; (11 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Sep. 26, 2016; Docket Nos. 240-241; (19 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Oct. 26, 2016-Nov. 17, 2016; Docket Nos. 242-246; (35 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 9, 2016-Feb. 3, 2017; Docket Nos. 247-256; (23 pages).

(56) References Cited

OTHER PUBLICATIONS

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Feb. 8, 2017-May 1, 2017; Docket Nos. 257-273; (69 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Feb. 10, 2017, made available on May 11, 2017; Docket Nos. 259; (52 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from May 2, 2017-Jul. 14, 2017; Docket Nos. 274-320; (1080 pages).

Defendant Zyxel's Initial Invalidity Contentions with Respect to Representative Asserted Claims for *TQ Delta, LLC v. Zyxel Communications Inc. et al.*—Including Claim Charts for Family 4 with Exhibits D1-D22; In the United States District Court for the District of Delaware; Civil Action No. 13-02013-RGA; filed Sep. 25, 2015 (459 pages).

Defendant Zyxel's Technologies, Inc.'s Final Invalidity Contentions in Response to Plaintiff's Dec. 8, 2016 Final Infringement Charts Regarding Non-Broadcom Products for *TQ Delta, LLC v. Zyxel Communications, Inc. and Zyxel Communications Corporation*—Including Claim Charts for Family 4 with Exhibits D1-D38; In the United States District Court for the District of Delaware; Civil Action No. 13-02013-RGA; filed Jan. 23, 2017 (1365 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 17, 2014-Oct. 19, 2015—Docket Nos. 1-65; (2,489 pages).

Documents filed with District Court Proceedings for *TQ Delta, LLC v. Adtran Inc.*; U.S. District. Court, for the District of Delaware (Wilmington); Civil Action No, 1:14-cv-00954-RGA; Includes documents filed from Jan. 20, 2016-Feb, 8, 2016—Docket Nos. 67-68; (81 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 9, 2016-Mar. 1, 2016 Docket Nos. 69-72; (13 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 28, 2016-May 31, 2016—Docket Nos. 74-77; (8 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 8, 2016, made publically available Jun. 6, 2016 Docket No. 73; (60 pages).

Documents filed with District Court Proceedings for *TQ Delta, LLC v. Adtran Inc.*; U.S. District. Court, for the District of Delaware (Wilmington); Civil Action No, 1:14-cv-00954-RGA; Includes documents filed from Jun. 7, 2016-Jun. 8, 2016; Docket Nos. 78-80; (73 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jun. 15, 2016; Docket Nos. 81; (2 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed on Jun. 27, 2016; Docket Nos. 82; (2 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Aug. 2-Sep. 1, 2016; Docket Nos. 83-86; (11 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Nov. 4, 2016-Nov. 17, 2016; Docket Nos. 87-90; (11 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Dec. 9, 2016-Feb. 3, 2017; Docket Nos. 91-99; (19 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 8, 2017-May 1, 2017; Docket Nos. 100-118; (128 pages).

Documents filed with District Court Proceedings for *TQ Delta, LLC v. Adtran Inc.*; U.S. District Court, for the District of Delaware (Wilmington); Civil Action No. 1:14-cv-00954-RGA;Includes documents filed on Feb. 10, 2017, made available on May 11, 2017; Docket Nos. 102; (52 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from May 2, 2017-Jul. 14, 2017; Docket Nos. 119-167; (1087 pages).

Defendant Adtran, Inc.'s Preliminary Invalidity Contentions with Regard to Representative Asserted Claims for *TQ Delta, LLC v. Adtran Inc.*—Including Claim Charts for Family 4 as Exhibits 4-1-4-23; U.S. District Court, for the District of Delaware (Wilmington); Civil Action No. 1:14-cv-00954-RGA and Civil Action No. 1:15-cv-00121-RGA; filed Feb. 9, 2016 (498 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Jul. 17, 2014-Mar. 1, 2016 Docket Nos. 1-77; (1,444 pages).

Documents filed with District Court Proceedings for *Adtran Inc. v. TQ Delta, LLC*; U.S. district Court, for the District of Delaware (Wilmington); Civil Action No. 1:15-cv-00121-RGA; Includes documents filed from Mar. 28, 2016-May 31, 2016; Docket Nos. 79-82; (8 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents on Mar. 8, 2016 made publically available June 6, 2016; Docket Nos. 78; (60 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Jun. 7, 2016-Jun. 8, 2016; Docket Nos. 83-85; (73 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Jun. 15, 2016; Docket Nos. 86; (2 pages).

Documents filed with District Court Proceedings for *Adtran Inc. v. TQ Delta, LLC*; U.S. district Court, for the District of Delaware (Wilmington); Civil Action No. 1:15-cv-00121-RGA; Includes documents filed on Jun. 27. 2016; Docket Nos. 87; (2 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documesnt filed from Aug. 2-Sep. 1, 2016; Docket Nos. 88-91; (11 pages).

(56) References Cited

OTHER PUBLICATIONS

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Nov. 4, 2016-Nov. 17, 2016; Docket Nos. 92-95; (11 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Dec. 9, 2016-Feb, 3, 2017; Docket Nos. 96-104 (19 pages).

Documents filed with District Court Proceedings for *Adtran Inc.* v. *TQ Delta, LLC*; U.S. district Court, for the District of Delaware (Wilmington); Civil Action No. 1:15-cv-00121-RGA; Includes documents filed from Feb. 8, 2017-May 1, 2017; Docket Nos. 105-122 (118 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed on Feb. 10, 2017, made available on May 11, 2017; Docket Nos. 107; (52 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from May 2, 2017-Jul. 14, 2017; Docket Nos. 122-169 (1083 pages).

Documents filed with District Court Proceedings for *Adtran Inc.* v. *TQ Delta, LLC*; U.S. District Court, for the Northern District of Alabama (Northeastern); Civil Action No. 5:14-cv-01381-JEO; Includes documents filed from Jul. 17, 2014-Jan. 27, 2015—Docket Nos. 1-32; (568 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; includes documents filed from Jul. 17, 2015-Nov. 6, 2015—Docket Nos. 1-20; (338 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Nov. 13, 2015-Dec. 11, 2015—Docket Nos. 21-30; (89 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Dec. 18, 2015-Jan. 7, 2016—Docket Nos. 31-36; (13 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Jan. 14, 2016-Feb. 5, 2016—Docket Nos. 37-45; (356 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Feb. 19, 2016-Mar. 4, 2016—Docket Nos. 46-48; (93 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Mar. 23, 2016-Apr. 22, 2016—Docket Nos. 49-54; (25 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Apr. 29, 2016-May 27, 2016—Docket Nos. 59-75; (722 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Jun. 10, 2016-Jun. 17, 2016—Docket Nos. 83-94; (180 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Jun. 24, 2016-Jul. 25, 2016; Docket Nos. 95-108; (299 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes Transcript made available Aug. 1, 2016; Docket No. 62 (63 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes Transcript made available Sep. 13, 2016; Docket No. 86 (26 pages).

Documents filed with District Court Proceedings for *TQ Delta, LLC* v.*Comcast Cable Communications LLC*; U.S. District Court, for the District of Delaware (Wilmington); Civil Action No. 1:15-cv-00611-RGA; Includes Transcript made available Sep. 13, 2016; Docket No. 87 (72 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Aug. 4-Sep. 13, 2016; Docket Nos. 109-133; (390 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Sep. 16, 2016; Docket Nos. 134-135 (2 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Sep. 20-Oct. 10, 2016; Docket Nos. 136-153 (1476 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Oct. 13, 2016-Nov. 22, 2016; Docket Nos. 154-208 (1083 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed Sep. 21, 2016, made available on Dec. 20, 2016; Docket No. 139 (39 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed Oct. 13, 2016, made available on Jan 11, 2017; Docket No. 154 (55 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; includes documents filed Oct. 19, 2016, made available on Jan 17, 2017; Docket No. 158 (164 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Nov. 22, 2016-Dec. 21, 2016; Docket Nos. 209-234 (929 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents made available on Feb. 13, 2017; Docket No. 190 (73 pages).

(56) References Cited

OTHER PUBLICATIONS

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Jul. 17, 2015-Nov. 13, 2015—Docket Nos. 1-21; (353 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Nov. 18, 2015-Jan. 6, 2016—Docket Nos. 22-34; (95 pages).

Documents filed with District Court Proceedings for *TQ Delta, LLC v. Coxcom LLC et al.*; U.S. District Court, for the District of Delaware (Wilimgton); Civil Action No. 1:15-cv-00612-RGA; Includes documents filed from Jan. 14, 2016-Feb. 5, 2016—Dockets Nos. 35-45 (361 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Feb. 19, 2016-Mar. 4, 2016; Docket Nos. 46-48 (93 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Mar. 23, 2016-Apr. 22, 2016; Docket Nos. 49-53 (23 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Apr. 29, 2016-May 27, 2016; Docket Nos. 58-72 (716 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Jun. 6, 2016-Jun. 17, 2016; Docket Nos. 74-92 (182 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Jun. 24, 2016-Jul. 25, 2016 ; Docket Nos. 93-106 (299 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes Transcript made available Aug. 1, 2016; Docket No. 61 (63 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes Transcript made available Sep. 13, 2016; Docket No. 84 (26 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes Transcrist made available Sep. 13, 2016; Docket No. 85 (72 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Aug. 4-Sep. 13, 2016; Docket Nos. 107-130 (387 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Sep. 16, 2016; Docket Nos. 131-132 (2 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Sep. 20-Oct. 10, 2016; Docket Nos. 133-150 (1476 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Oct. 13, 2016-Nov. 22, 2016; Docket Nos. 152-206 (1084 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed on Sep. 21, 2016, made publicly available on Dec. 20, 2016; Docket No. 136 (39 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed on Oct. 13, 2016, made publicly available on Jan. 11, 2017; Docket No. 151 (55 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed on Oct. 19, 2016, made publicly available on Jan. 17, 2017; Docket No. 155 (164 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed from Nov. 22, 2016-Dec. 21, 2016; Docket Nos. 207-232 (981 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents made available on Feb. 13, 2017; Docket No. 187 (73 pages).

Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Jul. 17, 2015-Nov. 23 2015—Docket Nos. 1-23; (460 pages).

Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Nov. 23, 2015-Jan. 6, 2016—Docket Nos. 24-35; (45 pages).

Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Jan. 19, 2016-Feb. 4, 2016—Docket Nos. 36-45; (358 pages).

Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Feb. 16, 2016-Mar. 4, 2016I Docket Nos. 46-50; (99 pages).

Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Mar. 23, 2016-Apr. 25, 2016; Docket Nos. 51-60; (33 pages).

Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Apr. 29, 2016-May 27, 2016; Docket Nos. 65-79; (716 pages).

Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Jun. 9, 2016-Jun. 17, 2016; Docket Nos. 85-102; (186 pages).

(56) References Cited

OTHER PUBLICATIONS

Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Jun. 24, 2016-Jul. 25, 2016; Docket Nos. 103-116; (299 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes Transcript made available Aug. 1, 2016; Docket No. 68 (63 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes Transcript made available Sep. 13, 2016; Docket No. 93 (26 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes Transcript made available Sep. 13, 2016; Docket No. 94 (72 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Aug. 4, 2016-Sep. 9, 2016; Docket Nos. 117-137; (385 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Sep. 20-Oct. 10, 2016; Docket Nos. 138-151; (1345 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Oct. 13, 2016-Nov. 22, 2016; Docket Nos. 153-193; (940 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed on Oct. 13, 2016—made publicly available Jan. 11, 2017; Docket No. 152; (55 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed on Oct. 19, 2016—made publicly available Jan. 17, 2017; Docket No. 156; (164 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes documents filed from Nov. 22, 2016-Dec. 21, 2016; Docket Nos. 194-223; (997 pages).
Documents filed with District Court Proceedings for *TQ Delta, LLC v. DirecTV LLC*; U.S. District Court, for the District of Delaware (Wilmington); Civil Action No. 1:15-cv-00613-RGA; Includes documents made available on Feb. 13, 2017; Docket No. 185; (73 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed from Jul. 17, 2015-Nov. 23 2015—Docket Nos. 1-28; (583 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed from Nov. 30, 2015-Jan. 5, 2016—Docket Nos. 29-36; (22 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed from Jan. 19, 2016-Feb. 5, 2016 Docket Nos. 37-48; (365 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA, Includes documents filed from Feb. 19, 2016-Mar. 7, 2016; Docket Nos. 49-52; (95 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed from Mar. 23, 2016-Apr. 25, 2016; Docket Nos. 54-59; (23 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed from Apr. 29, 2016-May 27, 2016; Docket Nos. 64-82; (856 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed from Jun. 2, 2016-Jun. 10, 2016; Docket Nos. 83-93; (23 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed from Jun. 15, 2016-Jun. 17, 2016; Docket Nos. 95-104; (178 pages).
Documents filed with District Court Proceedings for *TQ Delta, LLC v. DISH Network Corporation et al.*; U.S, District. Court, for the District of Delaware (Wilmington); Civil Action No. 1:15-cv-00614-RGA; Includes documents filed from Jun. 24, 2016-Jul. 15, 2016; Docket Nos. 105-114; (217 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes Transcript made available Aug. 1, 2016; Docket No. 67 (63 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA: Includes Transcript made available Sep. 13, 2016; Docket No. 96 (26 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes Transcript made available Sep. 13, 2016; Docket No. 97 (72 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed from Aug. 10, 2016-Sep. 9, 2016; Docket Nos. 115-131; (195 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA, Includes documents filed from Sep. 21-Oct. 10, 2016; Docket Nos. 132-142; (1304 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA: Includes documents filed from Oct. 13, 2016-Nov, 21, 2016; Docket Nos. 144-194; (1099 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed on Oct. 13, 2016, made publicly available on Jan. 11, 2017; Docket No. 143; (55 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed on Oct. 19, 2016, made publicly available on Jan. 17, 2017; Docket No. 147; (164 pages).
Documents filed with District Court Proceedings for *TQ Delta, LLC v. DISH Network Corporation et al.*; U.S. District Court, for the District of Delaware (Wilmington); Civil Action No. 1:15-cv-00614-RGA; Includes documents filed from Nov. 22, 2016-Dec. 21, 2016; Docket Nos. 195-218; (950 pages).

(56) References Cited

OTHER PUBLICATIONS

Documents filed with District Court Proceedings for *TQ Delta, LLC v. Time Warner Cable Inc., et al.*; U.S. District Court, for the District of Delaware (Wilmington); Civil Action No, 1:15-cv-00615-RGA; Includes documents filed from Jul. 17, 2015-Nov. 24 2015—Docket Nos. 1-23; (415 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Nov. 30, 2015-Jan. 6, 2016—Docket Nos. 2432; (24 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Jan. 14, 2016-Feb. 5, 2016; Docket Nos. 33-43; (361 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Feb. 19, 2016-Mar. 4, 2016; Docket Nos. 44-46; (93 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Mar. 23, 2016-Apr. 22, 2016; Docket Nos. 47-51; (23 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Apr. 29, 2016-May 27, 2016; Docket Nos. 56-71; (718 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Jun. 6, 2016-Jun. 17, 2016; Docket Nos. 73-91; (182 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Jun. 24, 2016-Jul. 25, 2016; Docket Nos. 92-106; (302 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes Transcript made available Aug. 1, 2016; Docket No. 59 (63 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes Transcript made available Sep. 13, 2016; Docket No. 83 (26 pages).

Documents filed with District Court Proceedings for *TQ Delta, LLC v. Time Warner Cable Inc., et al.*; U.S. District Court, for the District of Delaware (Wilmington); Civil Action No, 1:15-cv-00615-RGA; Includes Transcript made available Sep. 13, 2016; Docket No. 84 (72 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Aug. 4, 2016-Sep. 13, 2016; Docket Nos. 107-129; (383 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed Sep. 16, 2016; Docket Nos. 130-131; (2 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Sep. 20-Oct. 13, 2016; Docket Nos. 132-151; (1520 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Oct. 13, 2016-Nov, 22, 2016; Docket Nos. 152 200; (1031 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed Sep. 21, 2016 and made publicly available on Dec 20, 2016; Docket No. 135; (39 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed Oct. 13, 2016 and made publicly available on Jan. 11, 2017; Docket No. 150; (55 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed Oct. 19, 2016 and made publicly available on Jan. 17, 2017; Docket No. 154; (164 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed from Nov. 22, 2016-Dec. 21, 2016; Docket Nos. 201-221; (873 pages).

Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents made available on Feb. 13, 2017; Docket No. 186; (73 pages).

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Jul. 17, 2015-Nov. 18 2015—Docket Nos. 1-22; (432 pages).

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Nov. 23, 2015-Jan. 7, 2016—Docket Nos. 23-36; (32 pages).

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Jan. 14, 2016-Feb. 5, 2016—Docket Nos. 37-45; (354 pages).

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Feb. 19, 2016-Mar. 4, 2016; Docket Nos. 46-48; (93 pages).

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Mar. 23, 2016-Apr. 22, 2016; Docket Nos. 49-55; (21 pages).

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed on Apr. 13, 2016 and from Apr. 29, 2016-May 27, 2016; Docket Nos. 51; and 60-74; (721 pages).

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed on Apr. 13, 2016 and from Jun. 6, 2016-Jun. 17, 2016; Docket Nos. 76-95; (184 pages).

(56) References Cited

OTHER PUBLICATIONS

Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed from Jun. 24, 2016-Jul. 25, 2016; Docket Nos. 96-110; (298 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes Transcript made available Aug. 1, 2016; Docket No. 63 (63 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes Transcript made available Sep. 13, 2016; Docket No. 87 (26 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes Transcript made available Sep. 13, 2016; Docket No. 88 (72 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed from Aug. 4, 2016-Sep. 14, 2016; Docket Nos. 111-134; (386 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed from Sep. 16, 2016; Docket Nos. 135-136; (2 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed from Sep. 20-Oct. 13, 2016; Docket Nos. 137-156; (1520 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed from Oct. 13, 2016-Nov. 22, 2016; Docket Nos. 157-209; (1036 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed on Sep. 21, 2016 and made publicly available on Dec. 20, 2016; Docket No. 140; (39 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed on Oct. 13, 2016 and made publicly available on Jan. 11, 2017; Docket No. 155; (55 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed on Oct. 19, 2016 and made publicly available on Jan. 17, 2017; Docket No. 159; (164 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed from Nov. 22, 2016-Dec. 21, 2016; Docket Nos. 210-234; (980 pages).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents made available on Feb. 13, 2017; Docket No. 191; (73 pages).

Office Action for U.S. Appl. No. 15/298,817 dated Dec. 15, 2017.
Petitioner's Opposition to Patent Owner's Motion for Discovery for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jul. 21, 2017 (9 pages).
Patent Owner's Reply I/S/O Motion to Exclude Exs. 1022, 1023, 1024, 1025, and 1028, Portions of Ex. 2013, and Portions of Ex. 1026 Pursuant to 37 C.F.R. 42.34(c) for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Jul. 21, 2017 (9 pages).
Patent Owner Objections to Petitioners' Demonstratives for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Aug. 1, 2017 (5 pages).
Hearing Transcript for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Aug. 21, 2017 (63 pages).
Decision—Dismissing Patent Owner's Motion for Additional Discovery for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Oct. 26, 2017 (3 pages).
Final Written Decision for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Oct. 26, 2017 (39 pages).
Patent Owner's Request for Rehearing Pursuant to 37 CFR 42.71(d) for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Nov. 27, 2017 (20 pages).
Petitioner's Opposition to Patent Owner's Motion for Discovery for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jul. 21, 2017 (9 pages).
Patent Owner's Reply I/S/O Motion to Exclude Exs. 1022, 1023, 1024, 1025, and 1028, Portions of Ex. 2013, and Portions of Ex. 1026 Pursuant to 37 CFR 42.64 for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Jul. 21, 2017 (9 pages).
Patent Owner's Objections to Petitioners' Demonstratives for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Aug. 1, 2017 (5 pages).
Hearing Transcript for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Aug. 21, 2017 (63 pages).
Decision—Dismissing Patent Owners Motion for Additional Discovery for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Oct. 26, 2017 (3 pages).
Final Written Decision for *Cisco Systems, Inc.* v. *TQ Delta, LLC*, United States Patent and Trademark Office—Before the Patent Trial and Appeal Board, Case No. IRP 2016-01021 (U.S. Pat. No. 8,718,158) filed Oct. 26, 2017 (45 pages).
Patent Owner's Request for Rehearing Pursuant to 37 C.F.R. 42.71(d) for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Nov. 27, 2017 (20 pages).
Final Written Decision for *DISH Network, LLC* v. *TQ Delta, LLC*, United States Patent and Trademark Office—Before the Patent Trial and Appeal Board, Case No. IPR 2017-00254 (U.S. Appl. No. 9,014,243) filed Oct. 26, 2017 (39 pages).

(56) References Cited

OTHER PUBLICATIONS

Final Written Decision for *DISH Network, LLC* v. *TQ Delta, LLC*, United States Patent and Trademark Office—Before the Patent Trial and Appeal Board, Case No. IPR 2017-00255 (U.S. Pat. No. 8,718,158) filed Oct. 26, 2017 (45 pages).
Final Written Decision for *Comcast Cable Communication, LLC, et al.* v. *TQ Delta, LLC*, United States Patent and Trademark Office—Before the Patent Trial and Appeal Board, Case No. IPR 2017-00417 (U.S. Pat. No. 8,718,158) filed Oct. 26, 2017 (45 pages).
Final Written Decision for *Comcast Cable Communications, LLC et al.* v. *TQ Delta, LLC*, United States Patent arid Trademark Office—Before the Patent Trial and Appeal Board, Case No. IPR 2017-00418 (U.S. Pat. No. 9,014,243) filed Oct. 26, 2017 (39 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Jul. 24, 2017-Oct. 26, 2017; Docket Nos. 336-389; (3953 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed Jul. 24, 2017-Oct. 25, 2017; Docket Nos. 300-352; (3668 pages).
Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents filed from Jul. 24, 2017-Oct. 25, 2017; Docket Nos. 321-372; (3670 pages).
Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents filed from Jul. 21, 2017-Oct. 26, 2017; Docket Nos. 168-233; (4038 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jul. 21, 2017-Oct. 26, 2017; Docket Nos. 170-235 (4150 pages).
Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed on Oct. 27, 2017; Docket Nos. 235 (1 pages).
Documents filed with District Court Proceedings for *TQ Delta, LLC* v. *Coxcom LLC et al.*; U.S. District. Court, for the District of Delaware (Wilmington); Civil Action No, 1:15-cv-00612-RGA; Includes documents filed on Oct. 27, 2017; Docket Nos. 233 (1 page).
Documents filed with District Court Proceedings for *TQ Delta, LLC* v. *DirecTV LLC*; U.S. District Court, for the District of Delaware (Wilmington); Civil Action No. 1:15-cv-00613-RGA; Includes documents filed on Oct. 27, 2017; Docket No. 224; (1 page).
Documents filed with District Court Proceedings for *TQ Delta, LLC* v. *DISH Network Corporation et al.*; U.S. District Court, for the District of Delaware (Wilmington); Civil Action No. 1:15-cv-00614-RGA; includes documents filed on Oct. 27, 2017; Docket No. 219; (1 page).
Documents filed with District Court Proceedings for *TQ Delta, LLC* v. *Time Warner Cable Inc., et al.*; U.S. District Court, for the District of Delaware (Wilmington); Civil Action No. 1:15-cv-00615-RGA; Includes documents filed on Oct. 27, 2017; Docket No. 222; (1 p. 1).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed on Oct. 27, 2017; Docket No. 235; (1 page).

Decision re Request for Rehearing for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Feb. 1, 2018 (10 pages).
Decision Denying Patent Owner's Rehearing Request for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Feb. 1, 2018 (10 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Feb. 1, 2018-Mar. 19, 2018; Docket Nos. 399, 430-431, and 453-504 (1,482 pages).
Documents filed with District Court Proceedings for *TQ Delta, LLC* v. *Zhone Technologies Inc.*; U.S. District Court, for the District of Delaware (Wilmington); Civil Action No. 1:13-cv-01836-RGA; Includes documents filed Feb. 1, 2018-Mar. 6, 2018; Docket Nos. 358, 376, and 377 (326 pages).
Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents filed from Feb. 1, 2018-Mar. 19, 2018; Docket Nos. 378, 407-408; and 436-502; (4,366 pages).
Documents filed with District Court Proceedings for *TQ Delta, LLC* v. *Adtran Inc.*; U.S. District Court, for the District of Delaware (Wilmington); Civil Action No, 1:14-cv-00954-RGA; Includes documents filed from Feb. 1, 2018-Mar. 19, 2018; Docket Nos. 242; 266-267; and 292-359 (4,228 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Feb. 1, 2018-Mar. 19, 2018; Docket Nos. 242, 267-268, and 293-360 (4,228 pages).
Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed on Jan. 24, 2018 Docket No. 237 (1 page).
Documents filed with District Court Proceedings for *TQ Delta, LLC* v. *Coxcom LLC et al.*; U.S. District Court, for the District of Delaware (Wilmington); Civil Action No. 1:15-cv-00612-RGA; includes documents filed on Jan. 24, 2018; Docket No. 235 (1 page).
Documents filed with District Court Proceedings for *TQ Delta, LLC* v. *DirecTV LLC*; U.S. District Court, for the District of Delaware (Wilmington); Civil Action No. 1:15-cv-00613-RGA; Includes documents filed from Jan. 11-24, 2018; Docket No. 226-227; (2 pages).
Documents filed with District Court Proceedings for *TQ Delta, LLC* v. *DISH Network Corporation et al.*; U.S. District Court, for the District of Delaware (Wilmington); Civil Action No. 1:15-cv-00614-RGA: Includes documents filed on Jan. 24, 2018; Docket No. 221; (1 page).
Documents filed with District Court Proceedings for *TQ Delta, LLC* v. *Time Warner Cable Inc., et al.*; U.S. District Court, for the District of Delaware (Wilmington); Civil Action No. 1:15-cv-00615-RGA; Includes documents filed on Jan. 24, 2018; Docket No. 224; (1 page).
Documents filed with District Court Proceedings for *TQ Delta, LLC* v. *Verizon Services Corp*; U.S. District Court, for the District of Delaware (Wilmington); Civil Action No. 1:15-cv-00616-RGA; Includes documents filed on Jan. 24, 2018; Docket No. 237; (1 page).
Patent Owner's Notice of Appeal for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Apr. 2, 2018 (55 pages).
Update to the Arris Group, Inc. Petitioner's Mandatory Notices Pursuant to 37 CFR 42.8(A)(3) for *Cisco Systems, Inc.* v. *TQ Delta, LLC*, United States Patent and Trademark Office—Before the Patent Trial and Appeal Board, Case No. IPR 2016-01020 (U.S. Pat. No. 9,014,243) filed Apr. 20, 2018 (4 pages).

(56) References Cited

OTHER PUBLICATIONS

Patent Owner's Notice of Appeal for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Apr. 2, 2018 (61 pages).

Update to the Arris Group, Inc. Petitioner's Mandatory Notices Pursuant to 37 CFR 42.8(A)(3) for *Cisco Systems, Inc.* v. *TQ Delta, LLC*, United States Patent and Trademark Office—Before the Patent Trial and Appeal Board, Case No. IPR 2016-01021 (U.S. Pat. No. 8,718,158) filed Apr. 20, 2018 (4 pages).

Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents made Publicly Available on Mar. 26, 2018; Docket No. 452; (120 pages).

Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents made Publicly Available on Apr. 16, 2018; Docket No. 463; (145 pages).

Documents filed with District Court Proceedings for *TQ Delta, LLC* v. *2WIRE, Inc.*; U.S. District Court, for the District of Delaware (Wilmington); Civil Action No, 1:13-cv-01835-RGA; Includes documents made Publicly Available on May 9, 2018; Docket No. 487; (52 pages).

Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Mar. 27, 2018-Jun. 11, 2018; Docket Nos. 505-530; (450 pages).

Documents filed with District Court Proceedings for *TQ Delta, LLC* v. *Zhone Technologies Inc.*: U.S. District Court, for the District of Delaware (Wilmington); Civil Action No. 1:13-cv-01836-RGA; Includes documents made Publicly Available on Mar. 26, 2018; Docket No. 378 (120 pages).

Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents made publicly available on Mar. 26, 2018; Docket No. 435; (120 pages).

Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents made publicly available on Apr. 16, 2018; Docket No. 454; (145 pages).

Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents made publicly available on Apr. 17, 2018; Docket No. 454; (42 pages).

Documents filed with District Court Proceedings for *TQ Delta, LLC* v. *Zyxel Communications Inc. et al.*; U,S. District Court, for the District of Delaware (Wilmington); Civil Action No. 1:13-cv-02013-RGA; Includes documents made publicly available on May 10, 2018; Docket No. 482; (52 pages).

Documents filed with District Court Proceedings for *TQ Delta, LLC* v. *Zyxel Communications Inc. et al.*; U.S. District Court, for the District of Delaware (Wilmington); Civil Action No, 1:13-cv-02013-RGA; Includes documents made publicly available on May 14, 2018; Docket No. 485; (101 pages).

Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA; Includes documents filed from Mar. 29, 2018-Jun. 8, 2018; Docket Nos. 503-534; (465 pages).

Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents made publicly available on Mar. 26, 2018; Docket No. 291 (120 pages).

Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents made publicly available on Apr. 16, 2018; Docket No. 310 (145 pages).

Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents made publicly available on May 10, 2018; Docket No. 338 (52 pages).

Documents filed with District Court Proceedings for *TQ Delta, LLC* v. *Adtran Inc.*; U.S. District Court, for the District of Delaware (Wilmington); Civil Action No, 1:14-cv-00954-RGA; Includes documents made publicly available on May 14, 2018; Docket No. 342 (101 pages).

Documents filed with District Court Proceedings for *TQ Delta, LLC* v. *Adtran Inc.*; U.S. District Court, for the District of Delaware (Wilmington); Civil Action No. 1:14-cv-00954-RGA; Includes documents filed from Mar. 29, 2018-Jun. 7, 2018; Docket Nos. 360-419 (956 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on Mar. 26, 2018; Docket No. 292 (120 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on Apr. 16, 2018; Docket No. 313 (145 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on May 10, 2018; Docket No. 341 (52 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on May 14, 2018; Docket No. 345 (101 pages).

Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Mar. 29, 2018-Jun. 7, 2018; Docket Nos. 361-420 (956 pages).

Documents filed with District Court Proceedings for *TQ Delta, LLC* v. *Comcast Cable Communications LLC*; U.S. District Court, for the District of Delaware (Wilmington); Civil Action No. 1:15-cv-00611-RGA; Includes documents filed from Apr. 17, 2018-Apr. 19, 2018; Docket Nos. 238-240 (5 pages).

Documents filed with District Court Proceedings for *TQ Delta, LLC* v. *Coxcom LLC et al.*; U.S. District Court, for the District of Delaware (Wilmington); Civil Action No. 1:15-cv-00612-RGA; Includes documents filed from Apr. 17, 2018-Apr. 19, 2018; Docket Nos. 236-238 (5 pages).

Documents filed with District Court Proceedings for *TQ Delta, LLC* v. *DirecTV LLC*; U.S. District Court, for the District of Delaware (Wilmington); Civil Action No. 1:15-cv-00613-RGA; Includes documents filed from Apr. 17, 2018-Apr. 19, 2018; Docket Nos. 228-229; (4 pages).

Documents filed with District Court Proceedings for *TQ Delta, LLC* v. *Dish Network Corporation et al.*; U.S. District Court, for the District of Delaware (Wilmington); Civil Action No. 1:15-cv-00614-RGA; Includes documents filed from Apr. 17, 2018-Apr. 19, 2018; Docket Nos. 222-223; (4 pages).

Documents filed with District Court Proceedings for *TQ Delta, LLC* v. *Time Warner Cable Inc., et al.*; U.S. District Court, for the District of Delaware (Wilmington); Civil Action No. 1:15-cv-00615-RGA; Includes documents filed from Apr. 17, 2018-Apr. 19, 2018; Docket Nos. 225-227; (5 pages).

(56) References Cited

OTHER PUBLICATIONS

Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed from Apr. 17, 2018-Apr. 19, 2018; Docket Nos. 238-240; (6 pages).
Office Action for U.S. Appl. No. 15/298,817 dated Jul. 5, 2018.
Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents made publicly available on Jul. 12, 2018; (63 pages).
Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Jun. 11, 2018-Sep. 10, 2018; (133 pages).
Documents filed with District Court Proceedings for *TQ Delta, LLC v. Zyxel Communications Inc., et al.*; U.S. District Court, for the District of Delaware (Wilmington); Civil Action No. 1:13-cv-02013-RGA; Includes documents made publicly available on Jul. 12, 2018; (118 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 11, 2018-Sep. 10, 2018; (272 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Jul. 12, 2018; (181 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 3, 2018-Sep. 10, 2018; (696 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents made publicly on Jul. 12, 2018; (181 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Jun. 11, 2018-Sep. 10, 2018; (693 pages).
Documents filed with District Court Proceedings for *TQ Delta, LLC v. Comcast Cable Communications LLC*; U.S. District Court, for the District of Delaware (Wilmington); Civil Action No. 1:15-cv-00611-RGA; Includes documents filed on Jun. 29, 2018; (2 pages).

Documents filed with District Court Proceedings for *TQ Delta, LLC v. Coxcom LLC et al.*; U.S. District Court, for the District of Delaware (Wilmington); Civil Action No. 1:15-cv-00612-RGA; Includes documents filed on Jun. 29, 2018; (2 pages).
Documents filed with District Court Proceedings for *TQ Delta, LLC v. Time Warner Cable Inc., et al.*; U.S. District Court, for the District of Delaware (Wilmington); Civil Action No. 1:15-cv-00615-RGA; Includes documents filed on Jun. 29, 2018; (2 pages).
Documents filed with District Court Proceedings for *TQ Delta, LLC v. Verizon Services Corp*; U.S. District Court, for the District of Delaware (Wilmington); Civil Action No. 1:15-cv-00616-RGA; Includes documents filed on Jun. 29, 2018; (2 pages).
Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents made publicly available on Oct. 25, 2018; (94 pages).
Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Sep. 11, 2018-Nov. 21, 2018; (317 pages).
Documents filed with District Court Proceedings for *TQ Delta, LLC v. Zyxel Communications Inc. et al.*: U.S. District Court, for the District of Delaware (Wilmington); Civil Action No. 1:13-cv-02013-RGA: Includes documents made publicly available on Oct. 25, 2018; (94 pages).
Documents filed with District Court Proceedings for *TQ Delta, LLC v. Zyxel Communications Inc. et al.*; U.S. District Court, for the District of Delaware (Wilmington); Civil Action No, 1:13-cv-02013-RGA; Includes documents filed from Sep. 18, 2018-Nov. 27, 2018; (302 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Oct. 25, 2018; (94 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Sep. 18, 2018-Nov. 21, 2018; (486 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents made publicly available on Oct. 25, 2018; (94 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Sep. 18, 2018-Nov. 21, 2018; (486 pages).

\* cited by examiner

SYSTEM AND METHOD FOR SCRAMBLING THE PHASE OF THE CARRIERS IN A MULTICARRIER COMMUNICATIONS SYSTEM

RELATED APPLICATION

This application is a Continuation of U.S. patent application Ser. No. 14/540,332, filed Nov. 13, 2014, now U.S. Pat. No. 9,755,876, which is a Continuation of U.S. patent application Ser. No. 14/256,677, filed Apr. 18, 2014, now U.S. Pat. No. 8,929,470, which is a Continuation of U.S. patent application Ser. No. 13/303,417, filed Nov. 23, 2011, now U.S. Pat. No. 8,718,158, which is a Continuation of U.S. patent application Ser. No. 12/783,725, filed May 20, 2010, now U.S. Pat. No. 8,090,008, which is a Continuation of U.S. patent application Ser. No. 12/255,713, filed Oct. 22, 2008, now U.S. Pat. No. 7,769,104, which is a Continuation of U.S. patent application Ser. No. 11/863,581, filed Sep. 28, 2007, now U.S. Pat. No. 7,471,721, which is a Continuation of U.S. application Ser. No. 11/211,535, filed Aug. 26, 2005, now U.S. Pat. No. 7,292,627, which is a Continuation of U.S. patent application Ser. No. 09/710,310, filed Nov. 9, 2000, now U.S. Pat. No. 6,961,369, which claims the benefit of the filing date of U.S. Provisional Application, Ser. No. 60/164,134, filed Nov. 9, 1999, entitled "A Method For Randomizing The Phase Of The Carriers In A Multicarrier Communications System To Reduce The Peak To Average Power Ratio Of The Transmitted Signal," each of which are incorporated herein by reference in their entirety.

FIELD OF THE INVENTION

This invention relates to communications systems using multicarrier modulation. More particularly, the invention relates to multicarrier communications systems that lower the peak-to-average power ratio (PAR) of transmitted signals.

BACKGROUND OF THE INVENTION

In a conventional multicarrier communications system, transmitters communicate over a communication channel using multicarrier modulation or Discrete Multitone Modulation (DMT). Carrier signals (carriers) or sub-channels spaced within a usable frequency band of the communication channel are modulated at a symbol (i.e., block) transmission rate of the system. An input signal, which includes input data bits, is sent to a DMT transmitter, such as a DMT modem. The DMT transmitter typically modulates the phase characteristic, or phase, and amplitude of the carrier signals using an Inverse Fast Fourier Transform (IFFT) to generate a time domain signal, or transmission signal, that represents the input signal. The DMT transmitter transmits the transmission signal, which is a linear combination of the multiple carriers, to a DMT receiver over the communication channel.

The phase and amplitude of the carrier signals of DMT transmission signal can be considered random because the phase and amplitude result from the modulation of an arbitrary sequence of input data bits comprising the transmitted information. Therefore, under the condition that the modulated data bit stream is random, the DMT transmission signal can be approximated as having a Gaussian probability distribution. A bit scrambler is often used in the DMT transmitter to scramble the input data bits before the bits are modulated to assure that the transmitted data bits are random and, consequently, that the modulation of those bits produces a DMT transmission signal with a Gaussian probability distribution.

With an appropriate allocation of transmit power levels to the carriers or sub-channels, such a system provides a desirable performance. Further, generating a transmission signal with a Gaussian probability distribution is important in order to transmit a transmission signal with a low peak-to-average ratio (PAR), or peak-to-average power ratio. The PAR of a transmission signal is the ratio of the instantaneous peak value (i.e., maximum magnitude) of a signal parameter (e.g., voltage, current, phase, frequency, power) to the time-averaged value of the signal parameter. In DMT systems, the PAR of the transmitted signal is determined by the probability of the random transmission signal reaching a certain peak voltage during the time interval required for a certain number of symbols. An example of the PAR of a transmission signal transmitted from a DMT transmitter is 14.5 dB, which is equivalent to having a 1E−7 probability of clipping. The PAR of a transmission signal transmitted and received in a DMT communication system is an important consideration in the design of the DMT communication system because the PAR of a signal affects the communication system's total power consumption and component linearity requirements of the system.

If the phase of the modulated carriers is not random, then the PAR can increase greatly. Examples of cases where the phases of the modulated carrier signals are not random are when bit scramblers are not used, multiple carrier signals are used to modulate the same input data bits, and the constellation maps, which are mappings of input data bits to the phase of a carrier signal, used for modulation are not random enough (i.e., a zero value for a data bit corresponds to a 90 degree phase characteristic of the DMT carrier signal and a one value for a data bit corresponds to a −90 degree phase characteristic of the DMT carrier signal). An increased PAR can result in a system with high power consumption and/or with high probability of clipping the transmission signal. Thus, there remains a need for a system and method that can effectively scramble the phase of the modulated carrier signals in order to provide a low PAR for the transmission signal.

SUMMARY OF THE INVENTION

The present invention features a system and method that scrambles the phase characteristics of the modulated carrier signals in a transmission signal. In one aspect, a value is associated with each carrier signal. A phase shift is computed for each carrier signal based on the value associated with that carrier signal. The value is determined independently of any input bit value carried by that carrier signal. The phase shift computed for each carrier signal is combined with the phase characteristic of that carrier signal to substantially scramble the phase characteristics of the carrier signals.

In one embodiment, the input bit stream is modulated onto the carrier signals having the substantially scrambled phase characteristic to produce a transmission signal with a reduced peak-to-average power ratio (PAR). The value is derived from a predetermined parameter, such as a random number generator, a carrier number, a DMT symbol count, a superframe count, and a hyperframe count. In another embodiment, a predetermined transmission signal is transmitted when the amplitude of the transmission signal exceeds a certain level.

In another aspect, the invention features a method wherein a value is associated with each carrier signal. The value is determined independently of any input bit value carried by that carrier signal. A phase shift for each carrier signal is computed based on the value associated with that carrier signal. The transmission signal is demodulated using the phase shift computed for each carrier signal.

In another aspect, the invention features a system comprising a phase scrambler that computes a phase shift for each carrier signal based on a value associated with that carrier signal. The phase scrambler also combines the phase shift computed for each carrier signal with the phase characteristic of that carrier signal to substantially scramble the phase characteristic of the carrier signals. In one embodiment, a modulator, in communication with the phase scrambler, modulates bits of an input signal onto the carrier signals having the substantially scrambled phase characteristics to produce a transmission signal with a reduced PAR.

DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
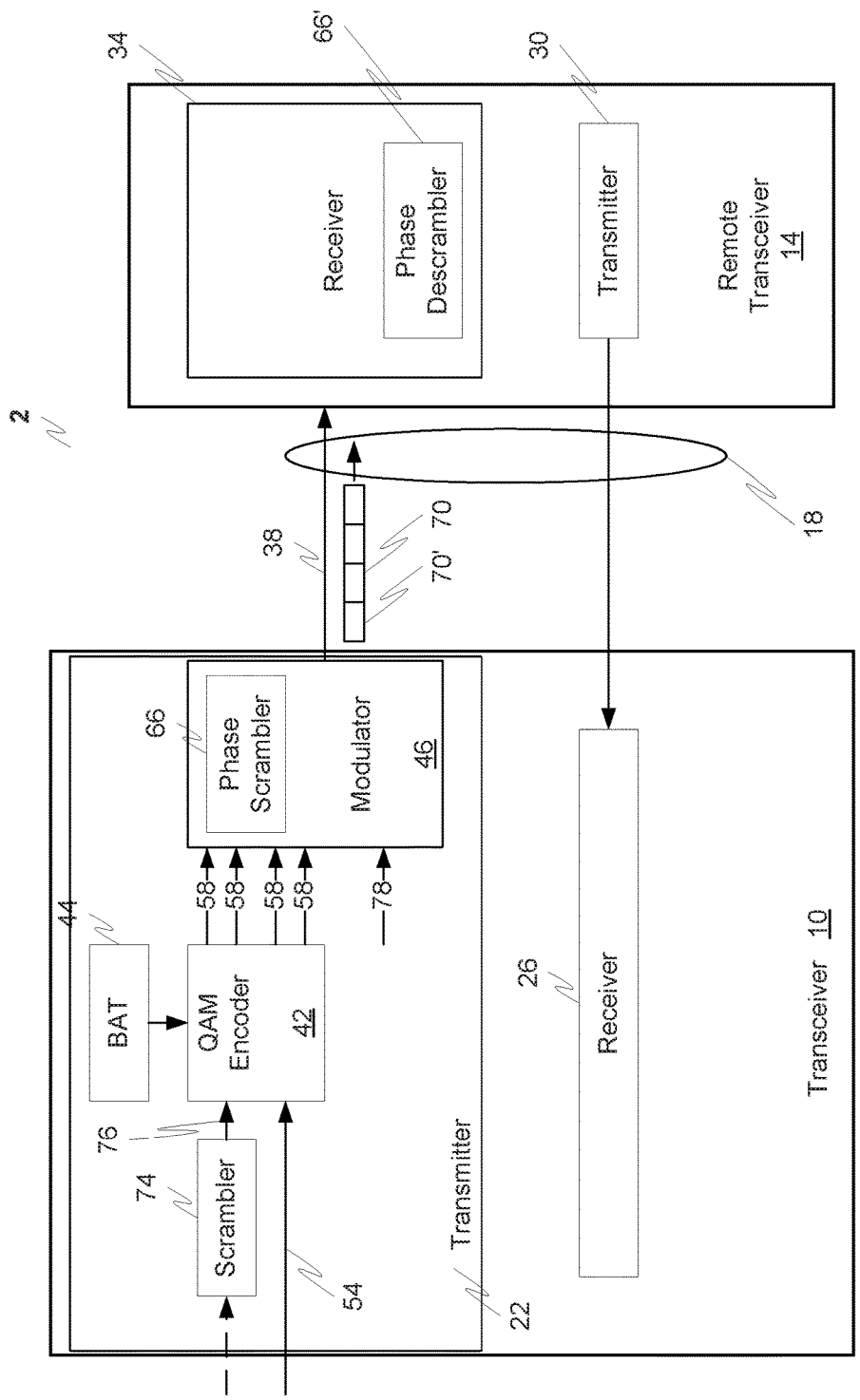
FIG. 1 is a block diagram of an embodiment of a digital subscriber line communications system including a DMT (discrete multitone modulation) transceiver, in communication with a remote transceiver, having a phase scrambler for substantially scrambling the phase characteristics of carrier signals.

FIG. 1 shows a digital subscriber line (DSL) communication system 2 including a discrete multitone (DMT) transceiver 10 in communication with a remote transceiver 14 over a communication channel 18 using a transmission signal 38 having a plurality of carrier signals. The DMT transceiver 10 includes a DMT transmitter 22 and a DMT receiver 26. The remote transceiver 14 includes a transmitter 30 and a receiver 34. Although described with respect to discrete multitone modulation, the principles of the invention apply also to other types of multicarrier modulation, such as, but not limited to, orthogonally multiplexed quadrature amplitude modulation (OQAM), discrete wavelet multitone (DWMT) modulation, and orthogonal frequency division multiplexing (OFDM).

The communication channel 18 provides a downstream transmission path from the DMT transmitter 22 to the remote receiver 34, and an upstream transmission path from the remote transmitter 30 to the DMT receiver 26. In one embodiment, the communication channel 18 is a pair of twisted wires of a telephone subscriber line. In other embodiments, the communication channel 18 can be a fiber optic wire, a quad cable, consisting of two pairs of twisted wires, or a quad cable that is one of a star quad cable, a Dieselhorst-Martin quad cable, and the like. In a wireless communication system wherein the transceivers 10, 14 are wireless modems, the communication channel 18 is the air through which the transmission signal 38 travels between the transceivers 10, 14.

By way of example, the DMT transmitter 22 shown in FIG. 1 includes a quadrature amplitude modulation (QAM) encoder 42, a modulator 46, a bit allocation table (BAT) 44, and a phase scrambler 66. The DMT transmitter 22 can also include a bit scrambler 74, as described further below. The remote transmitter 30 of the remote transceiver 14 comprises equivalent components as the DMT transmitter 22. Although this embodiment specifies a detailed description of the DMT transmitter 22, the inventive concepts apply also to the receivers 34, 26 which have similar components to that of the DMT transmitter 22, but perform inverse functions in a reverse order.

The QAM encoder 42 has a single input for receiving an input serial data bit stream 54 and multiple parallel outputs to transmit QAM symbols 58 generated by the QAM encoder 42 from the bit stream 54. In general, the QAM encoder 42 maps the input serial bit-stream 54 in the time domain into parallel QAM symbols 58 in the frequency domain. In particular, the QAM encoder 42 maps the input serial data bit stream 54 into N parallel quadrature amplitude modulation (QAM) constellation points 58, or QAM symbols 58, where N represents the number of carrier signals generated by the modulator 46. The BAT 44 is in communication with the QAM encoder 42 to specify the number of bits carried by each carrier signal. The QAM symbols 58 represent the amplitude and the phase characteristic of each carrier signal.

The modulator 46 provides functionality associated with the DMT modulation and transforms the QAM symbols 58 into DMT symbols 70 each comprised of a plurality of time-domain samples. The modulator 46 modulates each carrier signal with a different QAM symbol 58. As a result of this modulation, carrier signals have phase and amplitude characteristics based on the QAM symbol 58 and therefore based on the input-bit stream 54. In particular, the modulator 46 uses an inverse fast Fourier transform (IFFT) to change the QAM symbols 58 into a transmission signal 38 comprised of a sequence of DMT symbols 70. The modulator 46 changes the QAM symbols 58 into DMT symbols 70 through modulation of the carrier signals. In another embodiment, the modulator 46 uses the inverse discrete Fourier transform (IDFT) to change the QAM symbols 58 into DMT symbols 70. In one embodiment, a pilot tone is included in the transmission signal 38 to provide a reference signal for coherent demodulation of the carrier signals in the remote receiver 34 during reception of the transmission signal 38.

The modulator 46 also includes a phase scrambler 66 that combines a phase shift computed for each QAM-modulated carrier signal with the phase characteristic of that carrier signal. Combining phase shifts with phase characteristics, in accordance with the principles of the invention, substantially scrambles the phase characteristics of the carrier signals in the transmission signal 38. By scrambling the phase characteristics of the carrier signals, the resulting transmission signal 38 has a substantially minimized peak-to-average (PAR) power ratio. The phase scrambler 66 can be part of or external to the modulator 46. Other embodiments of the phase scrambler 66 include, but are not limited to, a software program that is stored in local memory and is executed on the modulator 46, a digital signal processor (DSP) capable of performing mathematical functions and algorithms, and the like. The remote receiver 34 similarly includes a phase descrambler 66' for use when demodulating carrier signals that have had their phase characteristics adjusted by the phase scrambler 66 of the DMT transceiver 10.

To compute a phase shift for each carrier signal, the phase scrambler 66 associates one or more values with that carrier signal. The phase scrambler 66 determines each value for a carrier signal independently of the QAM symbols 58, and, therefore, independently of the bit value(s) modulated onto the carrier signal. The actual value(s) that the phase scrambler 66 associates with each carrier signal can be derived from one or more predefined parameters, such as a pseudorandom number generator (pseudo-RNG), a DMT carrier number, a DMT symbol count, a DMT superframe count, a DMT hyperframe count, and the like, as described in more detail below. Irrespective of the technique used to produce each value, the same technique is used by the DMT transmitter 22 and the remote receiver 34 so that the value associated with a given carrier signal is known at both ends of the communication channel 18.

The phase scrambler 66 then solves a predetermined equation to compute a phase shift for the carrier signal, using the value(s) associated with that carrier signal as input that effects the output of the equation. Any equation suitable for computing phase shifts can be used to compute the phase shifts. When the equation is independent of the bit values of the input serial bit stream 54, the computed phase shifts are also independent of such bit values.

In one embodiment (shown in phantom), the DMT transmitter 22 includes a bit scrambler 74, which receives the input serial bit stream 54 and outputs data bits 76 that are substantially scrambled. The substantially scrambled bits 76 are then passed to the QAM encoder 42. When the bit scrambler 74 is included in the DMT transmitter 22, the operation of the phase scrambler 66 further assures that the transmission signal 38 has a Gaussian probability distribution and, therefore, a substantially minimized PAR.

Figure 2:
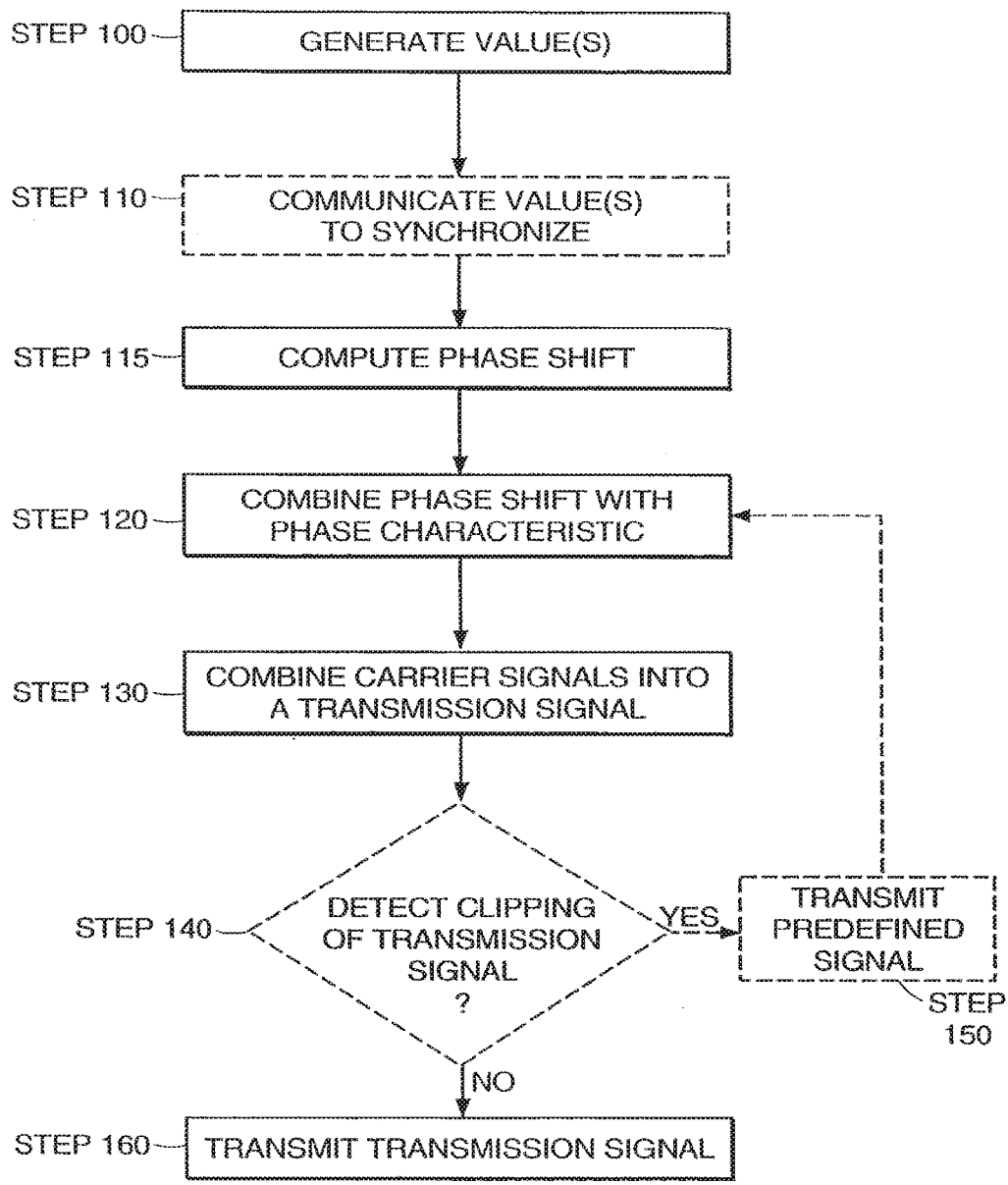
FIG. 2 is a flow diagram of an embodiment of a process for scrambling the phase characteristics of the carrier signals in a transmission signal.

FIG. 2 shows embodiments of a process used by the DMT transmitter 22 for adjusting the phase characteristic of each carrier signal and combining these carrier signals to produce the transmission signal 38. The DMT transmitter 22 generates (step 100) a value that is associated with a carrier signal. Because the value is being used to alter the phase characteristics of the carrier signal, both the DMT transmitter 22 and the remote receiver 34 must recognize the value as being associated with the carrier signal. Either the DMT transmitter 22 and the remote receiver 34 independently derive the associated value, or one informs the other of the associated value. For example, in one embodiment the DMT transmitter 22 can derive the value from a pseudo-RNG and then transmit the generated value to the remote receiver 34. In another embodiment, the remote receiver 34 similarly derives the value from the same pseudo-RNG and the same seed as used by the transmitter (i.e., the transmitter pseudo-RNG produces the same series of random numbers as the receiver pseudo-RNG).

As another example, the DMT transmitter 22 and the remote receiver 34 can each maintain a symbol counter for counting DMT symbols. The DMT transmitter 22 increments its symbol counter upon transmitting a DMT symbol; the remote receiver 34 upon receipt. Thus, when the DMT transmitter 22 and the remote receiver 34 both use the symbol count as a value for computing phase shifts, both the DMT transmitter 22 and remote receiver 34 "know" that the value is associated with a particular DMT symbol and with each carrier signal of that DMT symbol.

Values can also be derived from other types of predefined parameters. For example, if the predefined parameter is the DMT carrier number, then the value associated with a particular carrier signal is the carrier number of that signal within the DMT symbol. The number of a carrier signal represents the location of the frequency of the carrier signal relative to the frequency of other carrier signals within a DMT symbol. For example, in one embodiment the DSL communication system 2 provides 256 carrier signals, each separated by a frequency of 4.3125 kHz and spanning the frequency bandwidth from 0 kHz to 1104 kHz. The DMT transmitter 22 numbers the carrier signals from 0 to 255. Therefore, "DMT carrier number 50" represents the 51st DMT carrier signal which is located at the frequency of 215.625 kHz (i.e., 51×4.3125 kHz).

Again, the DMT transmitter 22 and the remote receiver 34 can know the value that is associated with the carrier signal because both the DMT transmitter 22 and the remote receiver 34 use the same predefined parameter (here, the DMT carrier number) to make the value-carrier signal association. In other embodiments (as exemplified above with the transmitter pseudo-RNG), the DMT transmitter 22 can transmit the value to the remote receiver 34 (or vice versa) over the communication channel 18.

In other embodiments, other predefined parameters can be used in conjunction with the symbol count. One example of such a predefined parameter is the superframe count that increments by one every 69 DMT symbols. One exemplary implementation that achieves the superframe counter is to perform a modulo 68 operation on the symbol count. As another example, the DMT transmitter 22 can maintain a hyperframe counter for counting hyperframes. An exemplary implementation of the hyperframe count is to perform a modulo 255 operation on the superframe count. Thus, the hyperframe count increments by one each time the superframe count reaches 255.

Accordingly, it is seen that some predefined parameters produce values that vary from carrier signal to carrier signal. For example, when the predefined parameter is the DMT carrier number, values vary based on the frequency of the carrier signal. As another example, the pseudo-RNG generates a new random value for each carrier signal.

Other predefined parameters produce values that vary from DMT symbol 70 to DMT symbol 70. For example, when the predefined parameter is the symbol count, the superframe count, or hyperframe count, values vary based on the numerical position of the DMT symbol 70 within a sequence of symbols, superframes, or hyperframes. Predefined parameters such as the pseudo-RNG, symbol count, superframe count, and superframe can also be understood to be parameters that vary values over time. Any one or combination of the predefined parameters can provide values for input to the equation that computes a phase shift for a given carrier signal.

In one embodiment, the phase scrambling is used to avoid clipping of the transmission signal 38 on a DMT symbol 70 by DMT symbol 70 basis. In this embodiment, the DMT transmitter 22 uses a value based on a predefined parameter that varies over time, such as the symbol count, to compute the phase shift. It is to be understood that other types of predefined parameters that vary the values associated with carrier signals can be used to practice the principles of the invention. As described above, the transceivers 10, 14 may communicate (step 110) the values to synchronize their use in modulating and demodulating the carrier signals.

The DMT transmitter 22 then computes (step 115) the phase shift that is used to adjust the phase characteristic of each carrier signal. The amount of the phase shift combined with the phase characteristic of each QAM-modulated carrier signal depends upon the equation used and the one or more values associated with that carrier signal.

The DMT transmitter 22 then combines (step 120) the phase shift computed for each carrier signal with the phase characteristic of that carrier signal. By scrambling the phase characteristics of the carrier signals, the phase scrambler 66 reduces (with respect to unscrambled phase characteristics) the combined PAR of the plurality of carrier signals and, consequently, the transmission signal 38. The following three phase shifting examples, PS #1-PS #3, illustrate methods used by the phase scrambler 66 to combine a computed phase shift to the phase characteristic of each carrier signal.

Phase Shifting Example #1

Phase shifting example #1 (PS #1) corresponds to adjusting the phase characteristic of the QAM-modulated carrier signal associated with a carrier number N by $$N \times \frac{\pi}{3},$$

modulo (mod) $2\pi$. In this example, a carrier signal having a carrier number N equal to 50 has a phase shift added to the phase characteristic of that carrier signal equal to $$50 \times \frac{\pi}{3} (\text{mod } 2\pi) = \frac{2}{3}\pi.$$

The carrier signal with a carrier number N equal to 51 has a phase shift added to the phase characteristic of that carrier signal equal to $$51 \times \frac{\pi}{3} (\text{mod } 2\pi) = \pi.$$

The carrier signal with the carrier number N equal to 0 has no phase shift added to the phase characteristic of that carrier signal.

Phase Shifting Example #2

Phase shifting example #2 (PS #2) corresponds to adjusting the phase characteristic of the QAM-modulated carrier signal associated with a carrier number N by $$(N+M) \times \frac{\pi}{4},$$

mod $2\pi$, where M is the symbol count. In this example, a carrier signal having a carrier number N equal to 50 on DMT symbol count M equal to 8 has a phase shift added to the phase characteristic of that carrier signal equal to $$(50+8) \times \frac{\pi}{4} (\text{mod } 2\pi) = \frac{\pi}{2}.$$

The carrier signal with the same carrier number N equal to 50 on the next DMT symbol count M equal to 9 has a phase shift added to the phase characteristic of that carrier signal equal to $$(50+9) \times \frac{\pi}{4} (\text{mod } 2\pi) = \frac{3\pi}{4}.$$

Phase Shifting Example #3

Phase shifting example #3 (PS #3) corresponds to adjusting the phase characteristic of the QAM-modulated carrier signal associated with a carrier number N by $$(X_N) \times \frac{\pi}{6},$$

mod $2\pi$, where XN is an array of N pseudo-random numbers. In this example, a carrier signal having a carrier number N equal to 5 and XN equal to [3, 8, 1, 4, 9, 5, . . . ] has a phase shift added to the phase characteristic of the carrier signal that is equal to $$(9) \times \frac{\pi}{6} (\text{mod } 2\pi) = \frac{3\pi}{2}$$

(Note that 9 is the 5th value in XN.) The carrier signal with a carrier number N equal to 6 has a phase shift added to the phase characteristic of the carrier signal equal to $$(5) \times \frac{\pi}{6} (\text{mod } 2\pi) = \frac{5\pi}{6}.$$

It is to be understood that additional and/or different phase shifting techniques can be used by the phase scrambler 66, and that PS #1, #2, and #3 are merely illustrative examples of the principles of the invention. The DMT transmitter 22 then combines (step 130) the carrier signals to form the transmission signal 38. If the transmission signal is not clipped, as described below, the DMT transmitter 22 consequently transmits (step 160) the transmission signal 38 to the remote receiver 34.

Clipping of Transmission Signals

A transmission signal 38 that has high peak values of voltage (i.e., a high PAR) can induce non-linear distortion in the DMT transmitter 22 and the communication channel 18. One form of this non-linear distortion of the transmission signal 38 that may occur is the limitation of the amplitude of the transmission signal 38 (i.e., clipping). For example, a particular DMT symbol 70 clips in the time domain when one or more time domain samples in that DMT symbol 70 are larger than the maximum allowed digital value for the DMT symbols 70. In multicarrier communication systems when clipping occurs, the transmission signal 38 does not accurately represent the input serial data bit signal 54.

In one embodiment, the DSL communication system 2 avoids the clipping of the transmission signal 38 on a DMT symbol 70 by DMT symbol 70 basis. The DMT transmitter 22 detects (step 140) the clipping of the transmission signal 38. If a particular DMT symbol 70 clips in the time domain to produce a clipped transmission signal 38, the DMT transmitter 22 substitutes (step 150) a predefined transmission signal 78 for the clipped transmission signal 38.

The predefined transmission signal 78 has the same duration as a DMT symbol 70 (e.g., 250 ms) in order to maintain symbol timing between the DMT transmitter 22 and the remote receiver 34. The predefined transmission signal 78 is not based on (i.e., independent of) the modulated input data bit stream 54; it is a bit value pattern that is recognized by the remote receiver 34 as a substituted signal. In one embodiment, the predefined transmission signal 78 is a known pseudo-random sequence pattern that is easily detected by the remote receiver 34. In another embodiment, the predefined transmission signal 78 is an "all zeros" signal, which is a zero voltage signal produced at the DMT transmitter 22 output (i.e., zero volts modulated on all the carrier signals). In addition to easy detection by the remote receiver 34, the zero voltage signal reduces the power consumption of the DMT transmitter 22 when delivered by the DMT transmitter 22. Further, a pilot tone is included in the predefined transmission signal 78 to provide a reference signal for coherent demodulation of the carrier signals in the remote receiver 34 during reception of the predefined transmission signal 78.

After the remote receiver 34 receives the transmission signal 38, the remote receiver 34 determines if the transmission signal 38 is equivalent to the predefined transmission signal 78. In one embodiment, when the remote receiver 34 identifies the predefined transmission signal 78, the remote receiver 34 ignores (i.e., discards) the predefined transmission signal 78.

Following the transmission of the predefined transmission signal 78, the phase scrambler 66 shifts (step 120) the phase characteristic of the QAM-modulated carrier signals (based on one of the predefined parameters that varies over time). For example, consider that a set of QAM symbols 58 produces a DMT symbol 70 comprising a plurality of time domain samples, and that one of the time domain samples is larger than the maximum allowed digital value for the DMT symbol 70. Therefore, because the transmission signal 38 would be clipped when sent to the remote receiver 34, the DMT transmitter 22 sends the predefined transmission signal 78 instead.

After transmission of the predefined transmission signal 78, the DMT transmitter 22 again attempts to send the same bit values that produced the clipped transmission signal 38 in a subsequent DMT symbol 70'. Because the generation of phase shifts in this embodiment is based on values that vary over time, the phase shifts computed for the subsequent DMT symbol 70' are different than those that were previously computed for the DMT symbol 70 with the clipped time domain sample. These different phase shifts are combined to the phase characteristics of the modulated carrier signals to produce carrier signals of the subsequent DMT symbol 70' with different phase characteristics than the carrier signals of the DMT symbol 70 with the clipped time domain sample.

DMT communication systems 2 infrequently produce transmission signals 38 that clip (e.g., approximately one clip every $10^7$ time domain samples 70). However, if the subsequent DMT symbol 70' includes a time domain sample that clips, then the predefined transmission signal 78 is again transmitted (step 150) to the remote receiver 34 instead of the clipped transmission signal 38. The clipping time domain sample may be on the same or on a different carrier signal than the previously clipped DMT symbol 70. The DMT transmitter 22 repeats the transmission of the predefined transmission signal 78 until the DMT transmitter 22 produces a subsequent DMT symbol 70' that is not clipped. When the DMT transmitter 22 produces a DMT symbol 70' that is not clipped, the DTM transmitter 22 transmits (step 160) the transmission signal 38 to the remote receiver 34. The probability of a DMT symbol 70 producing a transmission signal 38 that clips in the time domain depends on the PAR of the transmission signal 38.

For example, the following phase shifting example, PST #4, illustrates the method used by the phase scrambler 66 to combine a different phase shift to the phase characteristic of each carrier signal to avoid the clipping of the transmission signal 38.

Phase Shifting Example #4

Phase shifting example #4 (PS #4) corresponds to adjusting the phase characteristic of the carrier signal associated with a carrier number N by $$\frac{\pi}{3} \times (M + N),$$

mod $2\pi$, where M is the DMT symbol count. In this example, if the DMT symbol 70 clips when the DMT symbol count M equals 5, the predefined transmission signal 78 is transmitted instead of the current clipped transmission signal 38. On the following DMT symbol period, the DMT count M equals 6, thereby causing a different set of time domain samples to be generated for the subsequent DMT symbol 70', although the QAM symbols 58 used to produce both DMT symbols 70, 70' are the same.

If this different set of time domain samples (and consequently the transmission signal 38) is not clipped, the DMT transmitter 22 sends the transmission signal 38. If one of the time domain samples in the different set of time domain samples 70 (and consequently the transmission signal 38) is clipped, then the DMT transmitter 22 sends the predefined transmission signal 78 again. The process continues until a DMT symbol 70 is produced without a time domain sample 70 that is clipped. In one embodiment, the transmitter 22 stops attempting to produce a non-clipped DMT symbol 70' for the particular set of QAM symbols 58 after generating a predetermined number of clipped DMT symbols 70'. At that moment, the transmitter 22 can transmit the most recently produced clipped DMT symbol 70' or the predetermined transmission signal 78.

The PAR of the DSL communication system 2 is reduced because the predefined transmission signal 78 is sent instead of the transmission signal 38 when the DMT symbol 70 clips. For example, a DMT communication system 2 that normally has a clipping probability of 10-7 for the time domain transmission signal 38 can therefore operate with a 10-5 probability of clipping and a lower PAR equal to 12.8 dB (as compared to 14.5 dB). When operating at a 10-5 probability of clipping, assuming a DMT symbol 70 has 512 time-domain samples 70, the DMT transmitter 22 experiences one clipped DMT symbol 70 out of every $$\frac{10^5}{512},$$

or 195 DMT symbols 70. This results in the predefined (non-data carrying) transmission signal 78 being transmitted, on average, once every 195 DMT symbols. Although increasing the probability of clipping to 10-5 results in approximately a 0.5% ($1/195$) decrease in throughput, the PAR of the transmission signal 38 is reduced by 1.7 dB, which reduces transmitter complexity in the form of power consumption and component linearity.

While the invention has been shown and described with reference to specific preferred embodiments, it should be understood by those skilled in the art that various changes in form and detail may be made therein without departing from the spirit and scope of the invention as defined by the following claims. For example, although the specification uses DSL to describe the invention, it is to be understood that various form of DSL can be used, e.g., ADSL, VDSL, SDSL, HDSL, HDSL2, or SHDSL. It is also to be understood that the principles of the invention apply to various types of applications transported over DSL systems (e.g., telecommuting, video conferencing, high speed Internet access, video-on demand).

What is claimed:

1. A method, in a transceiver using a transmission signal having a plurality of carrier signals, comprising:
scrambling, by a phase scrambler, the plurality of carrier signals to at least reduce a Peak-to-Average Power Ratio (PAR) of a multicarrier signal when one or more data bits are transmitted on a first carrier signal of the multicarrier signal and the same one or more data bits are transmitted on a second carrier signal of the multicarrier signal,
determining, by a QAM encoder, a phase characteristic of a QAM symbol for the first carrier signal and the second carrier signal, wherein the phase characteristic depends at least on the one or more data bits;
determining, using a pseudo-random number generator and a seed value, a first value for the first carrier signal, wherein the first value is determined independently of the one or more data bits;
modifying, by the phase scrambler, the phase characteristic of the QAM symbol of the first carrier signal at least based on the first value to scramble the plurality of carrier signals to at least reduce the PAR of the multicarrier signal;
determining, using the pseudo-random number generator and the seed value, a second value for the second carrier signal, wherein the second value is determined independently of the one or more data bits and wherein the first and second values are different;
modifying by the phase scrambler, the phase characteristic of the QAM symbol of the second carrier signal at least based on the second value to scramble the plurality of carrier signals to reduce the PAR of the multicarrier signal;
modulating onto the first carrier signal the QAM symbol, wherein the phase characteristic of the QAM symbol of the first carrier was modified, by the phase scrambler, based at least on the first value;
modulating onto the second carrier signal the QAM symbol, wherein the phase characteristic of the QAM symbol of the second carrier was modified, by the phase scrambler, based at least on the second value; and
receiving the seed value prior to scrambling the plurality of carrier signals.

2. The method of claim 1, wherein the transceiver is a cable transceiver.

3. The method of claim 1, wherein transceiver is a VDSL transceiver.

4. The method of claim 1, wherein the transceiver is for high speed internet access.

5. The method of claim 1, wherein the transceiver is used for video.

6. The method of claim 1, wherein the transmission of the one or more data bits on the first and second carrier signals is to enable frequency diversity combining at a receiver.

7. The method of claim 1, wherein the first value for the first carrier signal is different on at least two DMT symbols.

8. The method of claim 1, wherein the independently determined first value is not associated with information associated with transmitting or receiving one or more data bits.

9. The method of claim 1, wherein the independently determined second value is not associated with information associated with transmitting or receiving the one or more data bits.

10. A transceiver, including a transmitter and receiver, operable to use a transmission signal having a plurality of carrier signals, the transceiver comprising:
a phase scrambler operable to scramble the plurality of carrier signals to reduce a Peak-to-Average Power Ratio (PAR) of a multicarrier signal when one or more data bits are transmitted on a first carrier signal of the multicarrier signal, and the same one or more data bits are transmitted on a second carrier signal of the multicarrier signal;
a QAM encoder operable to determine a phase characteristic of a QAM symbol for the first carrier signal and the second carrier signal, wherein the phase characteristic depends on the one or more data bits;
a pseudo-random number generator using a seed value to determine a first value for the first carrier signal, wherein the first value is determined independently of the one or more data bits;
the phase scrambler operable to modify the phase characteristic of the QAM symbol of the first carrier signal at least based on the first value to scramble the plurality of carrier signals to reduce the PAR of the multicarrier signal;
the pseudo-random number generator using the seed value to determine a second value for the second carrier signal, wherein the second value is determined independently of the one or more data bits and wherein the first and second values are different;
the phase scrambler operable to modify the phase characteristic of the QAM symbol of the second carrier signal at least based on the second value to scramble the plurality of carrier signals to reduce the PAR of the multicarrier signal;
a modulator operable to modulate onto the first carrier signal the QAM symbol, the phase characteristic of the QAM symbol of the first carrier having been modified based at least on the first value; and
the modulator operable to modulate onto the second carrier signal the QAM symbol, the phase characteristic of the QAM symbol of the second carrier having been modified based at least on the second value, wherein the seed value was received prior to scrambling the plurality of carrier signals.

11. The transceiver of claim 10, wherein the transceiver is a cable transceiver.

12. The transceiver of claim 10, wherein transceiver is a VDSL transceiver.

13. The transceiver of claim 10, wherein the transceiver is operable for high speed internet access.

14. The transceiver of claim 10, wherein the transceiver is operable to be used for video.

15. The transceiver of claim 10, wherein the transmission of the one or more data bits on the first and second carrier signals is to enable frequency diversity combining at a receiver.

16. The transceiver of claim 10, wherein the first value for the first carrier signal is different on at least two DMT symbols.

17. The transceiver of claim 10, wherein the independently determined first value is not associated with information associated with transmitting or receiving one or more data bits.

18. The transceiver of claim 10, wherein the independently determined second value is not associated with information associated with transmitting or receiving the one or more data bits.

19. The transceiver of claim 10, further comprising two or more connected elements including: a scrambler, a QAM encoder, the phase scrambler, a modulator, a digital signal processor, and memory.

20. The transceiver of claim 10, wherein the transceiver communicates over a communications channel with a remote transceiver.

21. The transceiver of claim 10, wherein power is saved in the transceiver.

22. The method of claim 1, wherein the modifying by the phase scrambler is based on an equation.

23. The transceiver of claim 10, wherein the modifying is based on an equation.

* * * * *